US011858270B2

(12) United States Patent
Shimizu et al.

(10) Patent No.: US 11,858,270 B2
(45) Date of Patent: Jan. 2, 2024

(54) LIQUID EJECTION HEAD, LIQUID EJECTION APPARATUS, PIEZOELECTRIC DEVICE, AND METHOD FOR MANUFACTURING PIEZOELECTRIC DEVICE

(71) Applicant: SEIKO EPSON CORPORATION, Tokyo (JP)

(72) Inventors: Toshihiro Shimizu, Fujimi-Machi (JP); Harunobu Koike, Matsumoto (JP); Takanori Aimono, Matsumoto (JP); Masao Nakayama, Shiojiri (JP); Tatsuo Sawasaki, Fujimi-machi (JP); Chihiro Nishi, Chino (JP); Noritaka Mochizuki, Kofu (JP); Yasushi Yamazaki, Azumino (JP); Osamu Tonomura, Ebina (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 17/322,204

(22) Filed: May 17, 2021

(65) Prior Publication Data

US 2021/0362501 A1 Nov. 25, 2021

(30) Foreign Application Priority Data

May 20, 2020 (JP) ................................ 2020-088044

(51) Int. Cl.
*B41J 2/14* (2006.01)
*B41J 2/175* (2006.01)
*B41J 2/025* (2006.01)

(52) U.S. Cl.
CPC .......... *B41J 2/14233* (2013.01); *B41J 2/025* (2013.01); *B41J 2/175* (2013.01)

(58) Field of Classification Search
CPC ........ B41J 2/14233; B41J 2/025; B41J 2/175; B41J 2002/14362; B41J 2002/14419; B41J 2002/14491; B41J 2202/03; B41J 2/17509; B41J 2/01; B41J 2/045; B41J 2/16
See application file for complete search history.

(56) References Cited

FOREIGN PATENT DOCUMENTS

JP 2008-078407 4/2008

OTHER PUBLICATIONS

IP.com search (Year: 2023).*
Naito, Nobuhiro et al., "Liquid Jet Head and Liquid Jet Apparatus", Jul. 7, 2014, Paragraphs 0011-0024, Abstract (Year: 2014).*

* cited by examiner

*Primary Examiner* — Lisa Solomon
(74) *Attorney, Agent, or Firm* — WORKMAN NYDEGGER

(57) ABSTRACT

A liquid ejection head includes: a piezoelectric body; an vibration plate to be vibrated by a drive of the piezoelectric body; and a pressure chamber substrate including a pressure chamber which applies a pressure to a liquid by an vibration of the vibration plate; the pressure chamber substrate, the vibration plate, and the piezoelectric body are laminated in this order; and the vibration plate includes: a first layer containing silicon as a constituent element, a second layer which is disposed between the first layer and the piezoelectric body and which contains as a constituent element, a metal element selected from chromium, titanium, and aluminum, and a third layer which is disposed between the second layer and the piezoelectric body and which contains zirconium as a constituent element.

21 Claims, 11 Drawing Sheets

LIQUID EJECTION HEAD, LIQUID EJECTION APPARATUS, PIEZOELECTRIC DEVICE, AND METHOD FOR MANUFACTURING PIEZOELECTRIC DEVICE

The present application is based on, and claims priority from JP Application Serial Number 2020-088044, filed May 20, 2020, the disclosure of which is hereby incorporated by reference herein in its entirety.

BACKGROUND

1. Technical Field

The present disclosure relates to a liquid ejection head, a liquid ejection apparatus, a piezoelectric device, and a method for manufacturing a piezoelectric device.

2. Related Art

A liquid ejection apparatus represented by a piezoelectric type ink jet printer includes a piezoelectric element and an vibration plate (oscillation plate) to be vibrated by a drive of the piezoelectric element. For example, JP-A-2008-78407 has disclosed an vibration plate including an elastic film formed from silicon dioxide and an insulating film formed from zirconium oxide. In this vibration plate, the elastic film is formed by thermal oxidation of one surface of a silicon single crystal substrate. The insulating film is formed by thermal oxidation of a layer of a zirconium element formed on the elastic film by a sputtering method or the like.

Compared to silicon, zirconium is likely to be oxidized. Hence, as disclosed in JP-A-2008-78407, in the structure in which the elastic film formed from silicon dioxide and the insulating film formed from zirconium oxide are in contact with each other, for example, by a thermal treatment performed when the insulating film is formed, the silicon dioxide in the elastic film is reduced by zirconium. Accordingly, a silicon element generated by this reduction diffuses from the elastic film to the insulating film, and in association with this diffusion, air gaps (voids) are liable to be formed between the elastic film and the insulating film in some cases. In association with an vibration of the vibration plate, the air gaps may cause damages, such as delamination and/or cracks, on the oscillator plate.

SUMMARY

According to an aspect of the present disclosure, there is provided a liquid ejection head comprising: a piezoelectric body; an vibration plate to be oscillated by a drive of the piezoelectric body; and a pressure chamber substrate including a pressure chamber which applies a pressure to a liquid by an vibration of the vibration plate. In the liquid ejection head described above, the pressure chamber substrate, the vibration plate, and the piezoelectric body are laminated in this order, and the vibration plate includes: a first layer containing silicon as a constituent element; a second layer which is disposed between the first layer and the piezoelectric body and which contains a metal element selected from chromium, titanium, and aluminum as a constituent element; and a third layer which is disposed between the second layer and the piezoelectric body and which contains zirconium as a constituent element.

According to another aspect of the present disclosure, there is provided a liquid ejection head comprising: a piezoelectric body; an vibration plate to be oscillated by a drive of the piezoelectric body; and a pressure chamber substrate including a pressure chamber which applies a pressure to a liquid by an vibration of the vibration plate. In the liquid ejection head described above, the pressure chamber substrate, the vibration plate, and the piezoelectric body are laminated in this order, and the vibration plate includes: a first layer containing silicon as a constituent element; a second layer which is disposed between the first layer and the piezoelectric body and which contains as a constituent element, a metal element unlikely to be oxidized as compared to zirconium; and a third layer which is disposed between the second layer and the piezoelectric body and which contains zirconium as a constituent element.

According to another aspect of the present disclosure, there is provided a liquid ejection head comprising: a piezoelectric body; an vibration plate to be oscillated by a drive of the piezoelectric body; and a pressure chamber substrate including a pressure chamber which applies a pressure to a liquid by an vibration of the vibration plate. In the liquid ejection head described above, the pressure chamber substrate, the vibration plate, and the piezoelectric body are laminated in this order, and the vibration plate includes: a first layer containing silicon as a constituent element; a second layer which is disposed between the first layer and the piezoelectric body and which contains as a constituent element, a metal element having free energy of oxide formation higher than that of zirconium; and a third layer which is disposed between the second layer and the piezoelectric body and which contains zirconium as a constituent element.

According to another aspect of the present disclosure, there is provided a liquid ejection apparatus comprising: any one of the liquid ejection heads described above; and a control portion which controls a drive of the piezoelectric body.

According to another aspect of the present disclosure, there is provided a piezoelectric device comprising: a piezoelectric body; and an vibration plate on which the piezoelectric body is laminated. In the piezoelectric device described above, the vibration plate includes: a first layer containing silicon as a constituent element; a second layer which is disposed between the first layer and the piezoelectric body and which contains as a constituent element, a metal element selected from chromium, titanium, and aluminum; and a third layer which is disposed between the second layer and the piezoelectric body and which contains zirconium as a constituent element.

According to another aspect of the present disclosure, there is provided a method for manufacturing a piezoelectric device which includes a piezoelectric body; and an vibration plate on which the piezoelectric body is laminated, the method comprising a step of forming the vibration plate and a step of forming the piezoelectric body. In the method described above, the step of forming the vibration plate forms a first layer containing silicon as a constituent element, a second layer containing as a constituent element, a metal element unlikely to be oxidized as compared to zirconium after the formation of the first layer, and a third layer containing zirconium as a constituent element after the formation of the second layer.

DESCRIPTION OF EXEMPLARY EMBODIMENTS

Figure 1:
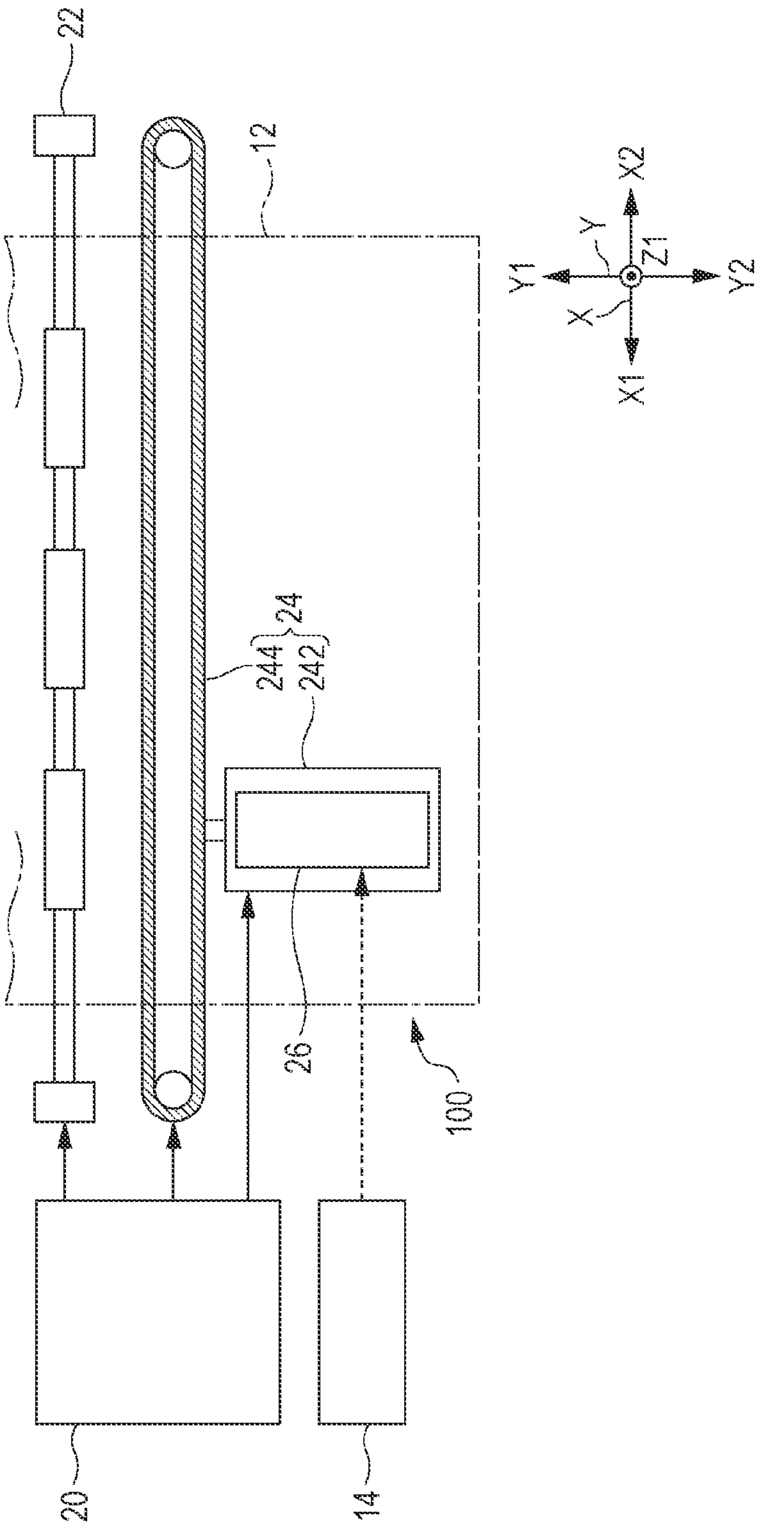
FIG. 1 is a schematic structural view of a liquid ejection apparatus according to a first embodiment.

Hereinafter, with reference to the attached drawings, preferable embodiments according to the present disclosure will be described. In addition, the dimensions and the scales of portions shown in the drawings are appropriately changed from the actual values, and to facilitate understanding of the present disclosure, some portions are schematically shown in some cases. In addition, the scope of the present disclosure is not limited to those described below unless otherwise particularly noted.

In addition, the following description will be performed appropriately using an X axis, a Y axis, and a Z axis which intersect with each other. In addition, one direction along the X axis is called an X1 direction, and a direction opposite to the X1 direction is called an X2 direction. As is the case described above, directions along the Y axis opposite to each are called a Y1 direction and a Y2 direction. In addition, directions along the Z axis opposite to each other are called a Z1 direction and a Z2 direction. To view in the direction along the Z axis is called "in plan view".

In addition, in general, the Z axis is a vertical axis, and the Z2 direction corresponds to a downward direction along the vertical direction. However, the Z axis is not always required to be the vertical direction. In general, although being orthogonal to each other, the X axis, the Y axis, and the Z axis are not limited thereto, and for example, those axes may intersect with each other within an angle of 80° to 100°.

1. First Embodiment

1-1. Total Structure of Liquid Ejection Apparatus

FIG. 1 is a schematic structural view of a liquid ejection apparatus 100 according to a first embodiment. The liquid ejection apparatus 100 is an ink jet type printing apparatus which ejects ink droplets, that is, one example of a liquid, to a medium 12. The medium 12 is typically printing paper. In addition, the medium 12 is not limited to printing paper and for example, may be a printing object, such as a resin film or a cloth, formed from an arbitrary material.

As shown in FIG. 1, to the liquid ejection apparatus 100, a liquid container 14 which stores an ink is fitted. As a particular mode of the liquid container 14, for example, a cartridge detachable to the liquid ejection apparatus 100, a bag-shaped ink pack formed from a flexible film, or an ink tank into which the ink can be replenished may be mentioned. In addition, the type of ink to be stored in the liquid container 14 may be arbitrarily selected.

The liquid ejection apparatus 100 includes a control unit 20, a transport mechanism 22, a transfer mechanism 24, and a liquid ejection head 26. The control unit 20 includes a processing circuit, such as a central processing unit (CPU) or a field programmable gate array (FPGA), and a memory circuit such as a semiconductor memory and controls operations of elements of the liquid ejection apparatus 100. In this liquid ejection apparatus 100, the control unit 20 is one example of a "control portion" and controls a drive of a piezoelectric body 443 which will be described below.

The transport mechanism 22 transports the medium 12 in the Y2 direction under the control by the control unit 20. The transfer mechanism 24 reciprocally transfers the liquid ejection head 26 in the X1 direction and the X2 direction under the control by the control unit 20. In the example shown in FIG. 1, the transfer mechanism 24 includes an approximately box-shaped transport body 242, which is a so-called carriage, to receive the liquid ejection head 26 and a transport belt 244 to which the transport body 242 is fixed. In addition, the number of the liquid ejection heads 26 mounted in the transport body 242 is not limited to one and may be at least two. In addition, in the transport body 242, besides the liquid ejection head 26, the liquid container 14 described above may also be mounted.

Under the control by the control unit 20, the liquid ejection head 26 ejects the ink to be supplied from the liquid container 14 from nozzles to the medium 12 in the Z2 direction. Since this ejection is performed in parallel with the transport of the medium 12 by the transport mechanism 22 and the reciprocation of the liquid ejection head 26 by the transfer mechanism 24, on a surface of the medium 12, an image of the ink is formed. In this case, the liquid ejection head 26 is one example of a "piezoelectric device". In addition, the structure of the liquid ejection head 26 and the manufacturing method thereof will be described below in detail.

1-2. Total Structure of Liquid Ejection Head

Figure 2:
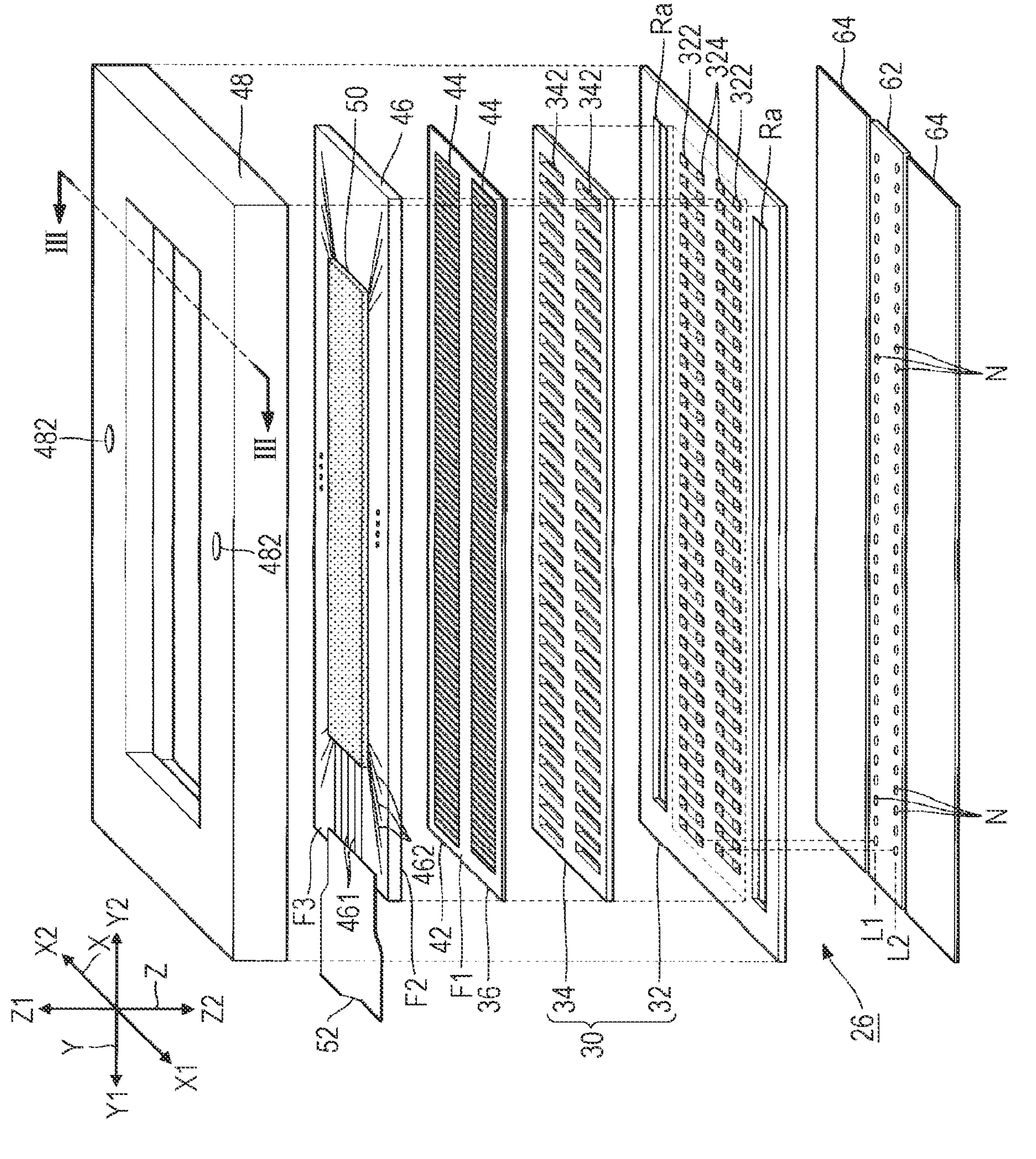
FIG. 2 is an exploded perspective view of a liquid ejection head according to the first embodiment.
Figure 3:
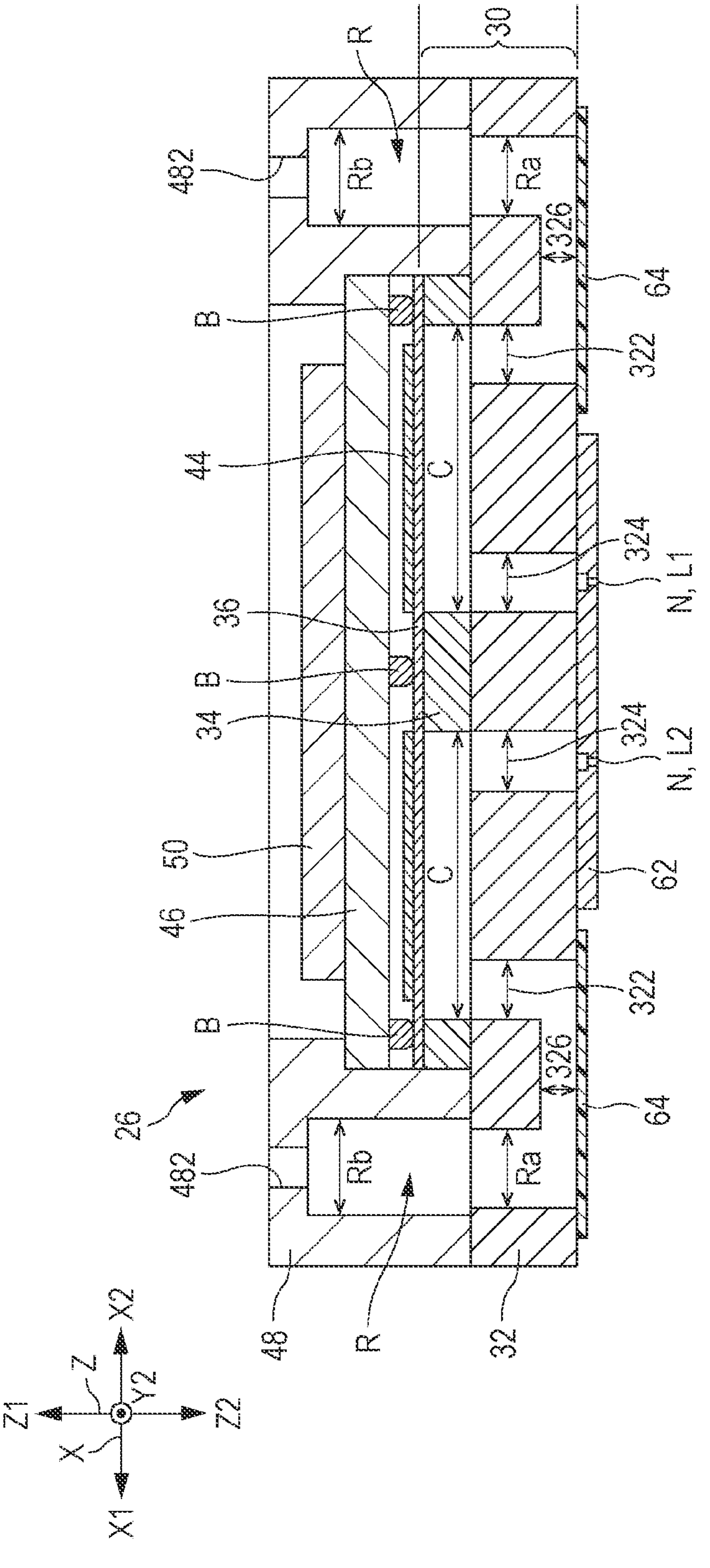
FIG. 3 is a cross-sectional view taken along the line III-III shown in FIG. 2.

FIG. 2 is an exploded perspective view of the liquid ejection head 26 according to the first embodiment. FIG. 3 is a cross-sectional view taken along the line III-III shown in FIG. 2. As shown in FIG. 2, the liquid ejection head 26 has a plurality of nozzles N aligned in the direction along the Y axis. In the example shown in FIG. 2, the nozzles N are separated into a first line L1 and a second line L2 which are arranged in the direction along the X axis with a predetermined interval therebetween. The first line L1 and the second line L2 are each a group of nozzles N aligned in the direction along the Y axis. In this case, elements relating to the respective nozzles N of the first line L1 and elements relating to the respective nozzles N of the second line L2 in the liquid ejection head 26 have structures approximately symmetric to each other in the direction along the X axis.

However, the positions of the nozzles N in the first line L1 and the positions of the nozzles N in the second line L2 in the direction along the Y axis may or may not coincide with each other. Hereinafter, the structure in which the positions of the nozzles N in the first line L1 and the positions of the nozzles N in the second line L2 in the direction along the Y axis coincide with each other will be described by way of example.

As shown in FIGS. 2 and 3, the liquid ejection head 26 includes a flow path structural body 30, a nozzle plate 62, vibration absorbing bodies 64, an vibration plate 36, a wiring substrate 46, a housing portion 48, and a drive circuit 50.

The flow path structural body 30 is a structural body in which flow paths to supply the ink to the nozzles N are formed. The flow path structural body 30 of this embodiment includes a flow path substrate 32 and a pressure chamber substrate 34, and those substrates are laminated in this order in the Z1 direction. The flow path substrate 32 and the pressure chamber substrate 34 are each a long plate-shaped member extending in the direction along the Y axis. The flow path substrate 32 and the pressure chamber substrate 34 are bonded to each other with an adhesive or the like.

In a region located in the Z1 direction than the flow path structural body 30, the vibration plate 36, the wiring substrate 46, the housing portion 48, and the drive circuit 50 are disposed. On the other hand, in a region located in the Z2 direction than the flow path structural body 30, the nozzle plate 62 and the vibration absorbing bodies 64 are disposed. The elements of the liquid ejection head 26 are each a long plate-shaped member extending in the Y axis approximately similar to the flow path substrate 32 and the pressure chamber substrate 34 and are bonded to each other with an adhesive or the like.

The nozzle plate 62 is a plate-shaped member in which the nozzles N are formed. The nozzles N are each a circular through-hole through which the ink is allowed to pass. The nozzle plate 62 may be manufactured by processing a silicon single crystal substrate by a semiconductor manufacturing technology which uses processing techniques, such as dry etching or wet etching. However, in the manufacturing of the nozzle plate 62, other known methods and materials may also be appropriately used.

In the flow path substrate 32, a space Ra, supply flow paths 322, communication flow paths 324, and a supply liquid chamber 326 are formed for each of the first line L1 and the second line L2. The space Ra is a long opening extending in the direction along the Y axis in a plan view viewed in the direction along the Z axis. The supply flow path 322 and the communication flow path 324 are through-holes formed for each nozzle N. The supply liquid chamber 326 is a long space extending in the direction along the Y axis so as to be along the nozzles N and communicates the space Ra with the supply flow paths 322. The communication flow paths 324 are overlapped with nozzles N which correspond thereto in plan view.

The pressure chamber substrate 34 is a plate-shaped member in which pressure chambers C, each of which is called a cavity, are formed for each of the first line L1 and the second line L2. The pressure chambers C are aligned in the direction along the Y axis. The pressure chamber C is formed for each nozzle N and is a long space extending in the direction along the X axis in plan view. As is the case of the nozzle plate 62 described above, the flow path substrate 32 and the pressure chamber substrate 34 are each manufactured, for example, by processing a silicon single crystal substrate using a semiconductor manufacturing technology. However, for the manufacturing of each of the flow path substrate 32 and the pressure chamber substrate 34, other known methods and materials may also be appropriately used.

The pressure chamber C is a space located between the flow path substrate 32 and the vibration plate 36. For each of the first line L1 and the second line L2, the pressure chambers C are aligned in the direction along the Y axis. In addition, the pressure chamber C communicates with the communication flow path 324 and the supply flow path 322. Hence, the pressure chamber C communicates with the nozzle N through the communication flow path 324 and also communicates with the space Ra through the supply flow path 322 and the supply liquid chamber 326.

On a surface of the pressure chamber substrate 34 facing in the Z1 direction, the vibration plate 36 is disposed. The vibration plate 36 is a plate-shaped member which can be elastically vibrated. The vibration plate 36 will be described later in detail.

On a surface of the vibration plate 36 facing in the Z1 direction, piezoelectric elements 44 corresponding to the nozzles N are disposed for each of the first line L1 and the second line L2. The piezoelectric elements 44 are each a passive element which is deformed by a drive signal supply. The piezoelectric elements 44 each have a long shape extending in the direction along the X axis in plan view. The piezoelectric elements 44 are aligned in the direction along the Y axis so as to correspond to the pressure chambers C. In association with the deformation of the piezoelectric element 44, when the vibration plate 36 is vibrated, the pressure in the pressure chamber C is changed, so that the ink is ejected from the nozzle N. The piezoelectric element 44 will be described later in detail.

The housing portion 48 is a case which stores the ink to be supplied into the pressure chambers C. As shown in FIG. 3, in the housing portion 48 of this embodiment, for each of the first line L1 and the second line L2, a space Rb is formed. The space Rb of the housing portion 48 and the space Ra of the flow path substrate 32 communicate with each other. A space formed by the space Ra and the space Rb functions as a liquid storage chamber (reservoir) R which stores the ink to be supplied into the pressure chambers C. The ink is supplied to the liquid storage chamber R through an inlet port 482 formed in the housing portion 48. The ink in the liquid storage chamber R is supplied into the pressure chambers C through the supply liquid chamber 326 and the supply flow paths 322. The vibration absorbing body 64 is a flexible film (compliance substrate) forming a wall surface of the liquid storage chamber R and absorbs the change in pressure of the ink therein.

The wiring substrate 46 is a plate-shaped member in which wires which electrically couple the drive circuit 50 to the piezoelectric elements 44 are formed. A surface of the wiring substrate 46 facing in the Z2 direction is bonded to the vibration plate 36 with electrically conductive bumps B interposed therebetween. On the other hand, on a surface of the wiring substrate 46 facing in the Z1 direction, the drive circuit 50 is mounted. The drive circuit 50 is an integrated circuit (IC) chip which outputs a drive signal to drive each piezoelectric element 44 and a reference voltage.

To a surface of the wiring substrate 46 facing in the Z1 direction, an end portion of an external wire 52 is bonded. The external wire 52 is formed, for example, of a coupling component, such as a flexible printed circuit (FPC) or a flexible flat cable (FFC). In this case, in the wiring substrate 46, as shown in FIG. 2, there are formed wires 461 which electrically couple the external wire 52 and the drive circuit 50 and wires 462 to which the drive signal and the reference voltage to be output from the drive circuit 50 are supplied.

1-3. Details of Vibration Plate and Piezoelectric Element

Figure 4:
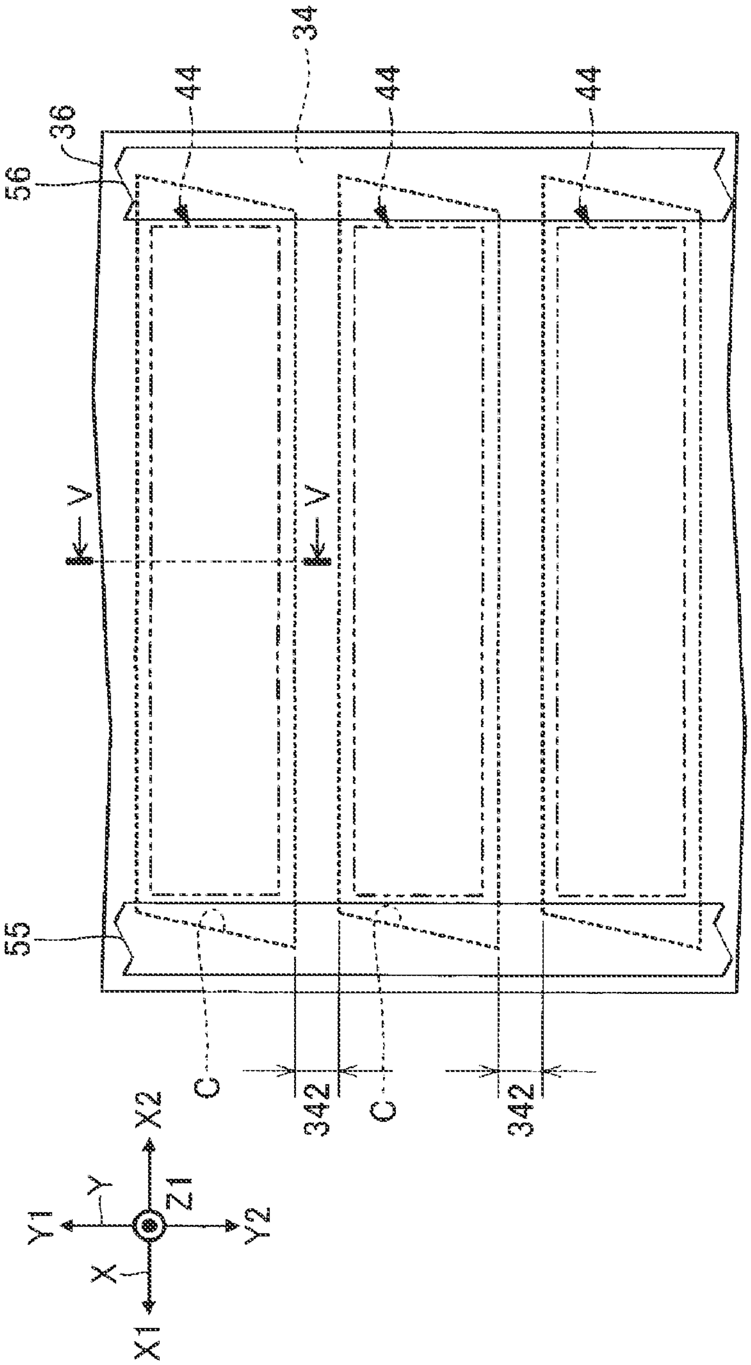
FIG. 4 is a plan view showing an vibration plate of the liquid ejection head according to the first embodiment.
Figure 5:
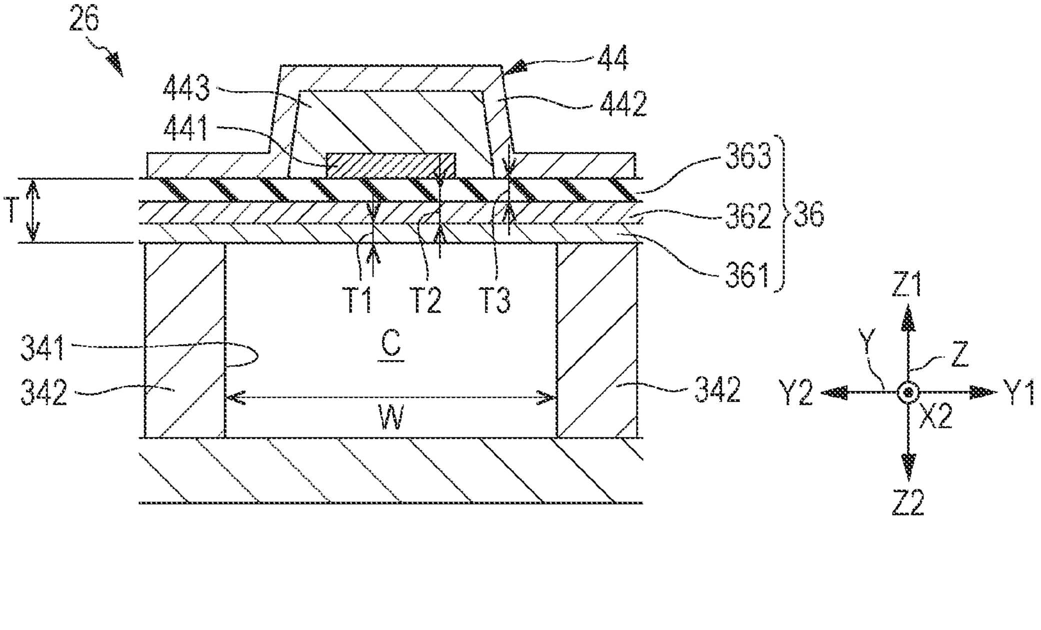
FIG. 5 is a cross-sectional view taken along the line V-V shown in FIG. 4.

FIG. 4 is a plan view showing the vibration plate 36 of the liquid ejection head 26 according to the first embodiment. FIG. 5 is a cross-sectional view taken along the line V-V shown in FIG. 4. In the liquid ejection head 26, as shown in FIGS. 4 and 5, the pressure chamber substrate 34, the vibration plate 36, and the piezoelectric elements 44 are laminated in this order in the Z1 direction.

As shown in FIG. 5, in the pressure chamber substrate 34, a hole 341 forming the pressure chamber C is provided. Accordingly, in the pressure chamber substrate 34, between two holes 341 adjacent to each other, a wall-shaped partition 342 extending in the direction along the X axis is provided. In FIG. 4, a plan view shape of the hole 341 formed by anisotropic etching of a silicon single crystal substrate having a plane orientation of (110) is shown by a dotted line. In addition, the plan view shape of the hole 341 is not limited to the example shown in FIG. 4 and may be arbitrarily formed.

As shown in FIG. 4, the piezoelectric element 44 is overlapped with the pressure chamber C in plan view. As shown in FIG. 5, the piezoelectric element 44 includes a first electrode 441, the piezoelectric body 443, and a second electrode 442, and those mentioned above are laminated in this order in the Z1 direction. In addition, the piezoelectric element 44 may also be configured such that at least one electrode and at least one piezoelectric layer are alternately laminated to form a multilayer structure so as to be expanded and contracted toward the vibration plate 36. In addition, between the layers of the piezoelectric element 44 or between the vibration plate 36 and the piezoelectric element 44, another layer, such as a layer which enhances the adhesion, may also be appropriately provided.

The first electrodes 441 are individual electrodes disposed separately from each other for the respective piezoelectric elements 44. In particular, the first electrodes 441 extending in the direction along the X axis are aligned in the direction along the Y axis with predetermined intervals therebetween. To the first electrode 441 of the piezoelectric element 44, a drive signal to eject the ink from the nozzle N corresponding to the piezoelectric element 44 described above is applied through the drive circuit 50.

The first electrode 441 includes, for example, a layer formed from iridium (Ir) and a layer formed from titanium (Ti), and those layers described above are laminated in this order in the Z1 direction. In this case, iridium is an excellent electrically conductive electrode material. Hence, when iridium is used as a constituent material of the first electrode 441, a decrease in resistance of the first electrode 441 can be achieved. In addition, according to the layer formed from titanium, when the piezoelectric body 443 is formed, an island-shaped Ti functions as a crystal nuclei and controls the orientation of the piezoelectric body 443, so that the crystallinity or the orientation of the piezoelectric body 443 is improved. In addition, instead of or in addition to the layer formed from iridium, a layer formed from another metal material may also be provided. As the another metal material, for example, a metal material, such as platinum (Pt), aluminum (Al), nickel (Ni), gold (Au), or copper (Cu), may be mentioned, and one metal material thereof may be used alone, or at least two types thereof may be used in combination. Alternatively, an oxide of at least one of the metal elements mentioned above may also be used.

The piezoelectric body 443 has a belt shape continuously extending in the direction along the Y axis so as to form the piezoelectric elements 44. Although not shown in the drawings, in the piezoelectric body 443, in regions each corresponding to a space between pressure chambers C adjacent to each other in plan view, through-holes penetrating the piezoelectric body 443 are provided so as to extend in the direction along the X axis.

The piezoelectric body 443 is formed from a piezoelectric material having a perovskite crystal structure represented by a general formula $ABO_3$. As the piezoelectric material described above, for example, there may be mentioned lead titanate ($PbTiO_3$), lead titanate zirconate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead niobate zirconium titanate ($Pb(Zr,Ti,Nb)O_3$), or lead magnesium niobate zirconium titanate ($Pb(Zr,Ti)(Mg,Nb)O_3$). Among those mentioned above, as the constituent material of the piezoelectric body 443, lead titanate zirconate may be preferably used.

The second electrode 442 is a belt-shaped common electrode continuously extending in the direction along the Y axis so as to form the piezoelectric elements 44. To the second electrode 442, a predetermined reference voltage is applied.

The second electrode 442 is formed, for example, from iridium (Ir). In addition, the constituent material of the second electrode 442 is not limited to iridium, and for example, a metal material, such as platinum (Pt), aluminum (Al), nickel (Ni), gold (Au), or copper (Cu), may also be used. In addition, as the second electrode 442, one metal material of those mentioned above may be used alone, or at least two types thereof may be used in combination in the form of a laminate or the like. Alternatively, an oxide of at least one of the metal elements mentioned above may also be used.

In the example shown in FIG. 4, on the surface of the second electrode 442, a first electrically conductive body 55 and a second electrically conductive body 56 are provided. The first electrically conductive body 55 is a belt-shaped electrically conductive film extending in the direction along the Y axis so as to be along one edge side of the second electrode 442 in the X1 direction. The second electrically conductive body 56 is a belt-shaped electrically conductive film extending in the direction along the Y axis so as to be along the other edge side of the second electrode 442 in the X2 direction. The first electrically conductive body 55 and the second electrically conductive body 56 are each formed, for example, from an electrically conductive material, such as gold, having a low electrical resistance and are simultaneously formed as the layers equivalent to each other. By the first electrically conductive body 55 and the second electrically conductive body 56 described above, a voltage drop of the reference voltage in the second electrode 442 can be suppressed. In addition, the first electrically conductive body 55 and the second electrically conductive body 56 each function as a weight which defines an vibration region of the vibration plate 36. In addition, the first electrically conductive body 55 and the second electrically conductive body 56 may be provided if needed and may be omitted in some cases.

As described above, the liquid ejection head 26 includes the piezoelectric body 443, the vibration plate 36 which is vibrated by the drive of the piezoelectric body 443, and the pressure chamber substrate 34 in which the pressure chambers C are provided to apply a pressure to the ink which is one example of the liquid by an vibration of the vibration plate 36. In addition, the pressure chamber substrate 34, the vibration plate 36, and the piezoelectric body 443 are laminated in this order.

As shown in FIG. 5, the vibration plate 36 includes a first layer 361, a second layer 362, and a third layer 363, and those layers are laminated in this order in the Z1 direction. That is, the vibration plate 36 includes the first layer 361, the second layer 362 disposed between the first layer 361 and the piezoelectric body 443, and the third layer 363 disposed between the second layer 362 and the piezoelectric body 443. In this case, the first layer 361 is bonded to the pressure chamber substrate 34. The third layer 363 is bonded to the piezoelectric elements 44. The second layer 362 is provided between the first layer 361 and the third layer 363. In addition, in FIG. 5, for the convenience of illustration, although the interfaces between the layers forming the vibration plate 36 are each clearly shown, the interfaces may be not clear, and for example, in the vicinity of the interface between two layers adjacent to each other, constituent materials of the two layers may be mixed with each other.

The first layer 361 is a layer containing silicon (Si) as a constituent element. In more particular, the first layer 361 is an elastic film formed, for example, from silicon oxide ($SiO_2$). In addition, in the first layer 361, besides silicon oxide and its constituent elements, an element, such as zirconium (Zr), titanium (Ti), iron (Fe), chromium (Cr), or hafnium (Hf), may also be contained in a small amount as an impurity. The impurity as mentioned above has a function to soften silicon oxide ($SiO_2$).

As described above, the first layer 361 contains, for example, silicon oxide. The first layer 361 as described above may be productively formed by thermal oxidation of a silicon single crystal substrate as compared to the case in which the formation is performed by a sputtering method.

In addition, the silicon in the first layer 361 is present in the form of an oxide and may also be present in the form of a single element, a nitride, an oxynitride, or the like. In addition, the impurity in the first layer 361 may be an element inevitably mixed therein when the first layer 361 is formed or may also be an element which is intentionally mixed therein.

Although a thickness T1 of the first layer 361 is determined in accordance with a thickness T, a width W, and the like of the vibration plate 36 and is not particularly limited, the thickness T1 is preferably in a range of 100 to 2,000 nm and more preferably in a range of 500 to 1,500 nm.

The third layer 363 is a layer containing zirconium (Zr) as a constituent element. In more particular, the third layer 363 is an insulating layer formed, for example, from zirconium oxide ($ZrO_2$). In this case, in the third layer 363, besides zirconium oxide and its constituent elements, an element, such as titanium (Ti), iron (Fe), chromium (Cr), or hafnium (Hf), may also be contained in a small amount as an impurity. The impurity as described above has a function to soften zirconium oxide ($ZrO_2$).

As described above, the third layer 363 contains, for example, zirconium oxide. The third layer 363 as described above may be formed such that after a layer of a zirconium element is formed by a sputtering method or the like, the layer described above is thermal-oxidized. Hence, when the third layer 363 is formed, a third layer 363 having a desired thickness can be obtained. In addition, since zirconium oxide has excellent electrically insulating property, mechanical strength, and toughness, when the third layer 363 contains zirconium oxide, the performance of the vibration plate 36 can be improved. In addition, for example, when the piezoelectric body 443 is formed from lead titanate zirconate, since the third layer 363 contains zirconium oxide, upon the formation of the piezoelectric body 443, a highly oriented (100) piezoelectric body 443 is also advantageously easily obtained.

In addition, the zirconium in the third layer 363 is present in the form of an oxide and may also be present in the form of a single element, a nitride, an oxynitride, or the like. In addition, the impurity in the third layer 363 may be an element inevitably mixed therein upon the formation of the third layer 363 or may also be an element intentionally mixed therein. For example, the impurity described above is an impurity contained in a zirconium target which is used when the third layer 363 is formed by a sputtering method.

Although a thickness T3 of the third layer 363 is determined in accordance with the thickness T, the width W, and the like of the vibration plate 36 and may not be particularly limited, for example, the thickness T3 is in a range of 100 to 2,000 nm.

Between the first layer 361 and the third layer 363, the second layer 362 is provided. Hence, the first layer 361 is prevented from being in contact with the third layer 363. Hence, compared to the structure in which the first layer 361 is in contact with the third layer 363, the silicon oxide in the first layer 361 is suppressed from being reduced by the zirconium in the third layer 363.

The second layer 362 is a layer containing as a constituent element, a metal element unlikely to be oxidized as compared to zirconium. In more particular, the second layer 362 is formed, for example, from an oxide of the above metal element. As the metal element, as described below, although aluminum, titanium, or chromium may be mentioned, for example, as another example, manganese, vanadium, tungsten, iron, copper, or the like may also be mentioned.

As described above, the second layer 362 contains a metal element unlikely to be oxidized as compared to zirconium. In other words, the second layer 362 contains a metal element having free energy of oxide formation higher than that of zirconium. The second layer 362 preferably contains as a constituent element, one metal element selected from chromium, titanium, and aluminum. In addition, the magnitude relationship in terms of free energy of oxide formation may be determined, for example, based on a known Ellingham diagram.

The metal element contained in the second layer 362 is unlikely to be oxidized as compared to zirconium. In other words, the free energy of oxide formation of the metal element contained in the second layer 362 is higher than the free energy of oxide formation of zirconium. Accordingly, compared to the structure in which the metal element contained in the second layer 362 is likely to be oxidized as compared to zirconium, that is, compared to the structure in which the free energy of oxide formation of the metal element contained in the second layer 362 is lower than the free energy of oxide formation of zirconium, the silicon oxide contained in the first layer 361 can be suppressed being reduced. Accordingly, since a silicon element generated by the reduction described above is suppressed from being diffused from the first layer 361 to the second layer 362, the generation of air gaps between the first layer 361 and the third layer 363 caused by the diffusion described above can suppressed. As a result, compared to the structure in which the second layer 362 is not used, the adhesion between the first layer 361 and the third layer 363 can be enhanced.

Chromium is unlikely to be oxidized as compared to silicon. In other words, the free energy of oxide formation of chromium is higher than the free energy of oxide formation of silicon. Hence, when chromium is contained as a metal element in the second layer 362, compared to the structure in which a metal element unlikely to be oxidized as compared to silicon is not contained in the second layer 362, the reduction of the silicon oxide contained in the first layer 361 can be suppressed.

In addition, an oxide of titanium or aluminum is likely to be transferred by heat. Hence, when titanium or aluminum is contained in the second layer 362 as a metal element, by an anchor effect or a chemical bond by an oxide of the metal element described above, the adhesion of the second layer 362 to each of the first layer 361 and the third layer 363 can be enhanced.

In addition, titanium is likely to form an oxide with silicon or zirconium. Hence, when titanium is contained in the second layer 362 as a metal element, since titanium forms an oxide together with silicon, the adhesion between the first layer 361 and the second layer 362 is enhanced, and/or since titanium forms an oxide together with zirconium, the adhesion between the first layer 361 and the third layer 363 is enhanced.

In addition, when the second layer 362 contains chromium, for example, chromium forms an oxide, and chromium oxide is contained. The second layer 362 as described above can be obtained such that after a layer of a chromium element is formed by a sputtering method or the like, the layer described above is thermal-oxidized. Hence, when the second layer 362 is formed, a second layer 362 having a desired thickness can be easily obtained.

In this case, the chromium oxide contained in the second layer 362 may be any one of a polycrystal, an amorphous substance, and a single crystal. However, when the chromium oxide contained in the second layer 362 has an amorphous structure which is in an amorphous state, compared to the structure in which the chromium oxide contained in the second layer 362 is in a polycrystal state or a single crystal state, a compression stress generated in the second layer 362 can be reduced. As a result, a strain generated in the interface between the second layer 362 and the first layer 361 or the third layer 363 can be reduced.

In addition, when the second layer 362 contains titanium, for example, titanium forms an oxide, and titanium oxide is contained. The second layer 362 as described above can be obtained such that after a layer of a titanium element is formed by a sputtering method or the like, the layer described above is thermal-oxidized. Hence, when the second layer 362 is formed, a second layer 362 having a desired thickness can be easily obtained.

In this case, the titanium oxide contained in the second layer 362 may be any one of a polycrystal, an amorphous substance, and a single crystal. However, the titanium oxide contained in the second layer 362 is preferably in a polycrystal state or a single crystal state, and as the crystal structure, a rutile structure is particularly preferable. Among the crystal structures which titanium oxide is able to have, the rutile structure is most stable and is not likely to be changed into a polymorph, such as an anatase or a brookite structure, even if being transferred by heat. Hence, since the titanium oxide contained in the second layer 362 has a rutile structure, compared to the case in which the titanium oxide contained in the second layer 362 has another crystal structure, thermal stability of the second layer 362 can be enhanced.

In addition, when the second layer 362 contains aluminum, for example, aluminum forms an oxide, and aluminum oxide is contained. The second layer 362 as described above can be obtained such that after a layer of an aluminum element is formed by a sputtering method or the like, the layer described above is thermal-oxidized. Hence, when the second layer 362 is formed, a second layer 362 having a desired thickness can be easily obtained.

In this case, the aluminum oxide contained in the second layer 362 may be any one of a polycrystal, an amorphous substance, and a single crystal, and when being in a polycrystal state or a single crystal state, the aluminum oxide described above has as a crystal structure, a trigonal structure.

In addition, besides the metal elements described above, the second layer 362 may also contain a small amount of an element, such as titanium (Ti), silicon (Si), iron (Fe), chromium (Cr), or hafnium (Hf), as an impurity. For example, the impurity described above is an element contained in the first layer 361 or the third layer 363. The impurity is present in the form of an oxide together with the metal element in the second layer 362. The impurity as described above suppresses the diffusion of silicon from the first layer 361 to the second layer 362, or even when silicon is diffused from the first layer 361 to the second layer 362, the impurity has an effect to suppress the diffusion of the silicon to the third layer 363.

From the points described above, the second layer 362 and the third layer 363 each preferably contain the impurity. In the case described above, compared to the case in which no impurity is contained, since the second layer 362 and the third layer 363 are each softened, risks, such as cracks in the vibration plate 36, can be favorably reduced.

The content of the impurity in the second layer 362 is preferably higher than the content of the impurity in the third layer 363. In other words, a concentration peak of the impurity in a thickness direction of a laminate formed of the second layer 362 and the third layer 363 is preferably located in the second layer 362. In this case, a space is prevented or suppressed from being formed in the interface between the second layer 362 and the third layer 363 or in the third layer 363. On the other hand, when the concentration peak described above is located in the third layer 363, the crystal structure in the third layer 363 is distorted by the impurity. Hence, the space is formed in the interface between the second layer 362 and the third layer 363 or in the third layer 363, and as a result, risks, such as cracks in the vibration plate 36, may be unfavorably increased in some cases.

The metal element in the second layer 362 described above is present in the form of an oxide and may also be present in the form of a single element, a nitride, an oxynitride, or the like. In addition, the impurity in the second layer 362 may be an element inevitably mixed therein when the second layer 362 is formed or may also be an element intentionally mixed therein.

In addition, although a thickness T2 of the second layer 362 is determined in accordance with the thickness T and the width W of the vibration plate 36 and is not particularly limited, the thickness T2 is preferably smaller than each of the thickness T1 of the first layer 361 and the thickness T3 of the third layer 363. In the case described above, the performance of the vibration plate 36 can be advantageously optimized.

When the metal element contained in the second layer 362 is titanium, the concrete thickness T2 of the second layer 362 is preferably in a range of 20 to 50 nm and more preferably in a range of 25 to 40 nm. In addition, when the metal element contained in the second layer 362 is aluminum, the concrete thickness T2 of the second layer 362 is preferably in a range of 20 to 50 nm and more preferably in a range of 20 to 35 nm. In addition, when the metal element contained in the second layer 362 is chromium, the concrete thickness T2 of the second layer 362 is preferably in a range of 1 to 50 nm and more preferably in a range of 2 to 30 nm. From those described above, it is found that even when the metal element contained in the second layer 362 is any one of titanium, aluminum, and chromium, if the thickness T2 of the second layer 362 is set in a range of 20 to 50 nm, preferable conditions are satisfied. Since the thickness T2 is set in the range described above, an effect to increase the adhesion between the first layer 361 and the third layer 363 by the second layer 362 can be preferably obtained.

On the other hand, when the thickness T2 is excessively small, depending on the type of metal element contained in the second layer 362, an effect to suppress the diffusion of a silicon element from the first layer 361 by the second layer 362 tends to be degraded. For example, when the second layer 362 is formed from titanium oxide, and the thickness T2 is excessively small, for example, depending on the condition of a thermal treatment in manufacturing, a silicon element diffused from the first layer 361 to the second layer 362 may reach the third layer 363 in some cases. On the other hand, when the thickness T2 is excessively large, the thermal treatment performed in manufacturing of the second layer 362 may not be sufficiently carried out in some cases, or since the thermal oxidation takes a long time, the other layers may be adversely influenced thereby in some cases.

1-4. Method for Manufacturing Piezoelectric Device

Figure 6:
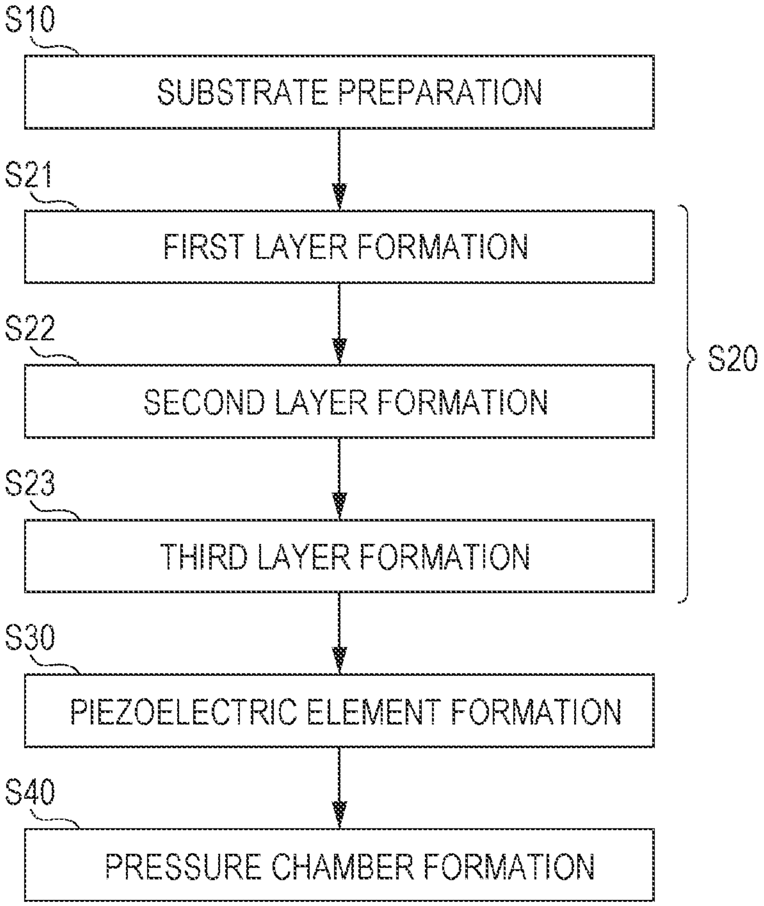
FIG. 6 is a flowchart illustrating a method for manufacturing a piezoelectric device.

FIG. 6 is a flowchart illustrating a method for manufacturing a piezoelectric device. Hereinafter, with reference to FIG. 6, a method for manufacturing a piezoelectric device will be described using the case in which the liquid ejection head 26 described above is manufactured as an example.

As shown in FIG. 6, a method for manufacturing the liquid ejection head 26 includes a substrate preparing step S10, an vibration plate forming step S20, a piezoelectric element forming step S30, and a pressure chamber forming step S40. In this case, the vibration plate forming step S20 includes a first layer forming step S21, a second layer forming step S22, and a third layer forming step S23. Hereinafter, the individual steps will be sequentially described.

The substrate preparing step S10 is a step of preparing a substrate to be formed into the pressure chamber substrate 34. The substrate is, for example, a silicon single crystal substrate.

The vibration plate forming step S20 is a step of forming the vibration plate 36 and is performed after the substrate preparing step S10. In the vibration plate forming step S20, the first layer forming step S21, the second layer forming step S22, and the third layer forming step S23 are performed in this order.

The first layer forming step S21 is a step of forming the first layer 361 described above. In the first layer forming step S21, for example, by thermal oxidation of one surface of the silicon single crystal substrate prepared in the substrate preparing step S10, the first layer 361 is formed from silicon oxide ($SiO_2$).

The second layer forming step S22 is a step of forming the second layer 362 described above. In the second layer forming step S22, after a layer of chromium, titanium, or aluminum is formed on the first layer 361 by a sputtering method, the layer described above is thermal-oxidized, so that the second layer 362 is formed from chromium oxide, titanium oxide, or aluminum oxide. In addition, the formation of the second layer 362 is not limited to a method using thermal oxidation, and for example, a chemical vapor deposition (CVD) method or an atomic layer deposition (ALD) method may also be used. In addition, the thermal oxidation in the second layer forming step S22 may be simultaneously performed together with the thermal oxidation in the third layer forming step S23 which will be described below.

The third layer forming step S23 is a step of forming the third layer 363 described above. In the third layer forming step S23, for example, after a layer of zirconium is formed on the second layer 362 by a sputtering method, the layer described above is thermal-oxidized, so that the third layer 363 is formed from zirconium oxide.

The piezoelectric element forming step S30 is a step of forming the piezoelectric elements 44 described above and is performed after the third layer forming step S23. In the piezoelectric element forming step S30, the first electrodes 441, the piezoelectric body 443, and the second electrode 442 are formed on the third layer 363 in this order.

The first electrode 441 and the second electrode 442 are each formed, for example, by a known film forming technique, such as a sputtering method, and known processing techniques, such as photolithography and etching. The piezoelectric body 443 is formed such that after a precursor layer of the piezoelectric body is formed by a sol-gel method, the precursor layer is crystallized by firing.

After the piezoelectric elements 44 are formed, if needed, one of the two surfaces of the substrate opposite to that on which the piezoelectric elements 44 are formed is polished by chemical mechanical polishing (CMP), so that the surface described above is planarized, or the thickness of the substrate is adjusted.

The pressure chamber forming step S40 is a step of forming the pressure chambers C described above and is performed after the piezoelectric element forming step S30. In the pressure chamber forming step S40, for example, after the piezoelectric elements 44 are formed, one of the two surfaces of the silicon single crystal substrate opposite to the surface on which the piezoelectric elements 44 are formed is anisotropically etched, so that the holes 341 forming the pressure chambers C are formed. Since the holes 341 are formed, the pressure chamber substrate 34 is obtained. In this case, as an etching solution for the anisotropic etching, for example, an aqueous potassium hydroxide (KOH) solution may be used. In addition, in this case, the first layer 361 functions as a stop layer to stop the anisotropic etching.

After the pressure chamber forming step S40, for example, a step of bonding the flow path substrate 32 and the like to the pressure chamber substrate 34 with an adhesive is appropriately performed, so that the liquid ejection head 26 is obtained.

2. Second Embodiment

Hereinafter, a second embodiment of the present disclosure will be described. In the embodiment which will be described by way of example, elements having actions or functions similar to those described in the first embodiment will be designated by the same reference numerals used in the first embodiment, and detailed descriptions thereof will be appropriately omitted.

Figure 7:
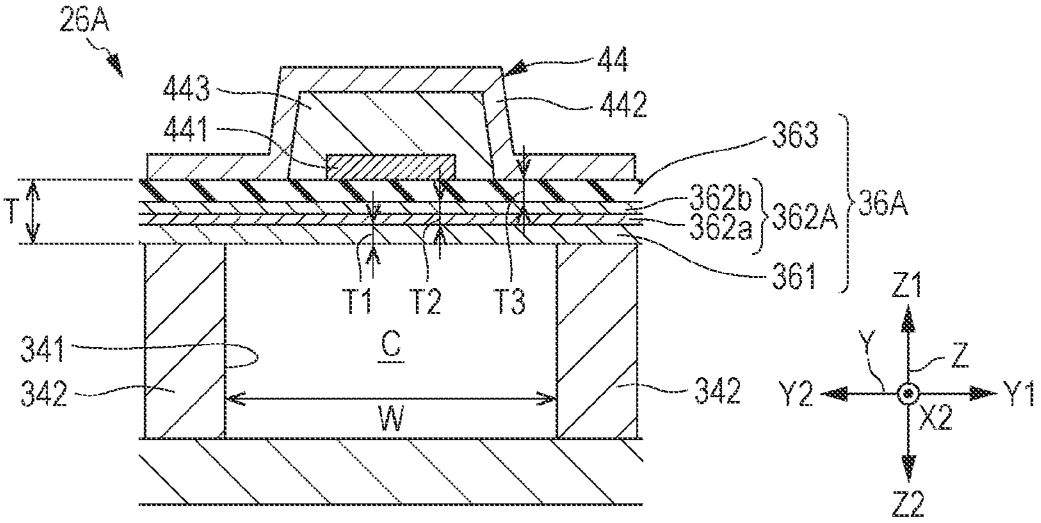
FIG. 7 is a cross-sectional view of a liquid ejection head according to a second embodiment.

FIG. 7 is a cross-sectional view of a liquid ejection head 26A according to the second embodiment. Except for that an vibration plate 36A is provided instead of the vibration plate 36, the liquid ejection head 26A is similar to the liquid ejection head 26 of the first embodiment. The vibration plate 36A is similar to the vibration plate 36 except for that a second layer 362A is used instead of the second layer 362.

In addition, in FIG. 7, for the convenience for illustration, although the interfaces between layers forming the vibration plate 36A are clearly shown, the interfaces may be not clear, and for example, in the vicinity of the interface between two layers adjacent to each other, constituent materials of the two layers may be mixed with each other.

The second layer 362A includes a layer 362*a* and a layer 362*b*, and those layers are laminated in this order in the Z1 direction. The layers 362*a* and 362*b* are each a layer containing a metal element unlikely to be oxidized as compared to zirconium and are each formed, for example, from an oxide containing the metal element mentioned above.

However, compositions of the materials forming the layers 362*a* and 362*b* are different from each other. In particular, the type of impurity or the content thereof of the layer 362*a* is different from that of the layer 362*b*. The impurity is, as is the case of the first embodiment described above, an element, such as titanium (Ti), silicon (Si), iron (Fe), chromium (Cr), or hafnium (Hf). The layers 362*a* and 362*b* are each formed such that, for example, after a layer of the above single metal element is formed by a sputtering method or the like, the time, the temperature, or the like of a heat treatment is adjusted so that the distribution of the impurity in the layer is changed in its thickness direction. In addition, the formation of those layers is not particularly limited, and for example, by a CVD method or the like, the individual layers may be separately formed.

When silicon is contained in the layer 362*a* as the impurity, the layer 362*b* can be regarded as a "second layer", and in this case, the layer 362*a* can be regarded as a "fourth layer". That is, the layer 362*a* is disposed between the first layer 361 and the layer 362*b* and contains the metal element contained in the layer 362*b* and silicon. As described above, since silicon is contained in the layer 362*a*, the diffusion of silicon from the first layer 361 to the second layer 362A is suppressed, or even when silicon is diffused from the first layer 361 to the second layer 362A, the silicon can be suppressed from being diffused to the third layer 363. In addition, an effect in which a space is not likely to be formed in the interface between the first layer 361 and the second layer 362A is also obtained.

In this case, although the layer 362*b* may contain silicon, the content of silicon in the layer 362*a* is preferably higher than the content of silicon in the layer 362*b*. In other words, the content of silicon in the layer 362*b* is preferably lower than the content of silicon in the layer 362*a*. Since the relationship of the content of silicon between the layer 362*a* and 362*b* is set as described above, for example, when the second layer 362A contains titanium oxide, a crystal strain of titanium oxide in the second layer 362A caused by silicon can be reduced. In addition, since the content of silicon in the layer 362*b* is decreased, the adhesion between the layer 362*b* and the third layer 363 can be enhanced.

In addition, when zirconium is contained in the layer 362*b* as the impurity, the layer 362*a* can be regarded as a "second layer", and in this case, the layer 362*b* can be regarded as a "fifth layer". That is, the layer 362*b* is disposed between the layer 362*a* and the third layer 363 and contains the metal element contained in the layer 362*a* and zirconium. As described above, since zirconium is contained in the layer 362*b*, diffusion of zirconium from the third layer 363 to the second layer 362A is suppressed, or even when zirconium is diffused from the third layer 363 to the second layer 362A, the zirconium can be suppressed from being diffused to the first layer 361. In addition, an effect in which a space is not likely to be generated in the interface between the third layer 363 and the second layer 362A is also obtained.

In the second embodiment described above, as is the case of the first embodiment, the generation of damages, such as delamination and/or cracks, on the vibration plate can be suppressed.

3. Third Embodiment

Hereinafter, a third embodiment of the present disclosure will be described. In the embodiment which will be described by way of example, elements having actions and functions similar to those of the first embodiment will be designated by the same reference numerals used in the first embodiment, and detailed descriptions thereof will be appropriately omitted.

Figure 8:
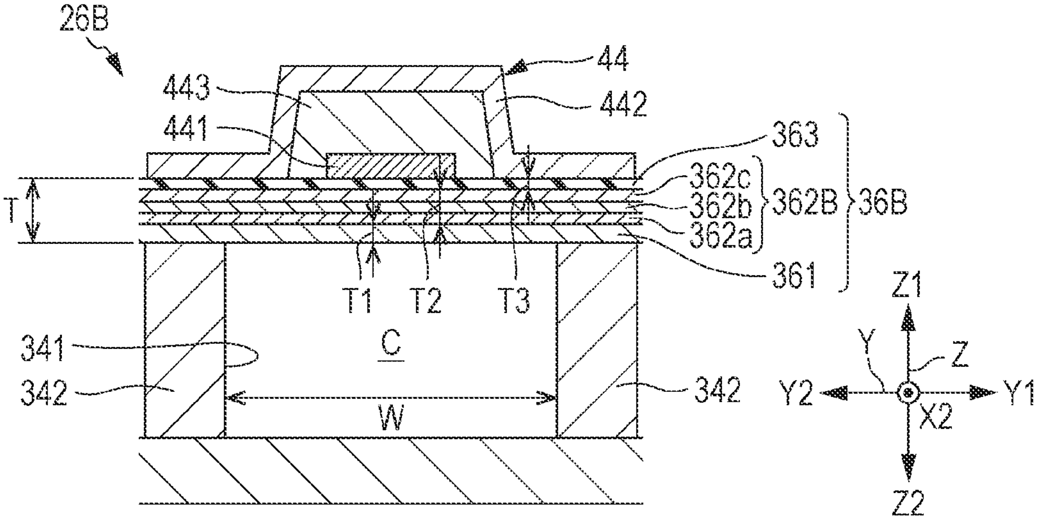
FIG. 8 is a cross-sectional view of a liquid ejection head according to a third embodiment.

FIG. 8 is a cross-sectional view of a liquid ejection head 26B according to the third embodiment. Except for that an vibration plate 36B is used instead of the vibration plate 36, the liquid ejection head 26B is similar to the liquid ejection head 26 of the first embodiment described above. Except for that a second layer 362B is used instead of the second layer 362, the vibration plate 36B is similar to the vibration plate 36. In addition, in FIG. 8, although the interfaces between layers forming the vibration plate 36B are clearly shown, the interfaces may be not clear, and for example, in the vicinity of the interface between two layers adjacent to each other, constituent materials of the two layers described above may be mixed with each other.

The second layer 362B includes a layer 362*a*, a layer 362*b*, and a layer 362*c*, and those layers are laminated in this order in the Z1 direction. The layer 362*a*, the layer 362*b*, and the layer 362*c* are each a layer containing a metal element unlikely to be oxidized as compared to zirconium and are each formed, for example, from an oxide of the metal element described above.

However, compositions of materials forming the layers 362*a*, 362*b*, and 362*c* are different from each other. In particular, the types of impurities or the contents thereof of the layers 362*a*, 362*b*, and 362*c* are different from each other. As is the case of the first embodiment described above, the impurity is an element, such as titanium (Ti), silicon (Si), iron (Fe), chromium (Cr), or hafnium (Hf). The formation of the layers 362*a*, 362*b*, and 362*c* is performed such that after a layer is formed from the above single metal element by a sputtering method or the like, the time, the temperature, or the like of a heat treatment is adjusted so that the distribution of the impurity in the layer is changed in its thickness direction. In addition, the formation of those layers is not particularly limited, and for example, by a CVD method or the like, the individual layers may be separately formed.

As is the case of the second embodiment described above, when silicon is contained in the layer 362*a* as the impurity, the layer 362*b* can be regarded as a "second layer", and in this case, the layer 362*a* can be regarded as a "fourth layer".

In addition, when zirconium is contained in the layer 362*c* as the impurity, the layer 362*b* can be regarded as a "second layer", and in this case, the layer 362*c* can be regarded as a "fifth layer". That is, the layer 362*c* is disposed between the layer 362*b* and the third layer 363 and contains the metal element contained in the layer 362*b* and zirconium. As described above, since zirconium is contained in the layer 362*c*, diffusion of zirconium from the third layer 363 to the second layer 362B is suppressed, or even when zirconium is diffused from the third layer 363 to the second layer 362B, the zirconium can be suppressed from being diffused to the first layer 361. In addition, an effect in which a space is not likely to be generated in the interface between the third layer 363 and the second layer 362B is also be obtained.

As is the case of the first embodiment described above, in the third embodiment described above, the generation of damages, such as delamination and/or cracks, on the vibration plate can also be suppressed.

4. Modified Examples

The embodiments described above by way of example may be variously changed and/or modified. Concrete modified modes to be applied to the above embodiments will be described by way of example. In addition, at least two modes arbitrarily selected from the following examples may be appropriately used in combination with each other as long as no contradiction occurs therebetween.

4-1. Modified Example 1

As long as having a structure including a piezoelectric body and an vibration plate, the liquid ejection head is not limited to the structure described in the above embodiments. In addition, in the embodiments described above, as one example of the piezoelectric device, although the liquid ejection head has been described, the piezoelectric device is not limited thereto. Besides the liquid ejection head, for example, the piezoelectric device may be a drive device, such as a piezoelectric actuator which includes a piezoelectric body and an vibration plate or a detection device, such as a pressure sensor which includes a piezoelectric body and an vibration plate.

4-2. Modified Example 2

In the embodiments described above, the liquid ejection head 26, 26A, or 26B includes the piezoelectric elements 44 which contain the piezoelectric body 443. In this case, the piezoelectric elements 44 include the first electrodes 441 provided for the respective piezoelectric elements 44 and the second electrode 442 commonly provided for the piezoelectric elements 44. The first electrodes 441 are disposed between the piezoelectric body 443 and the vibration plate 36.

As described above, in the embodiments described above, although the structure in which the first electrodes 441 are individual electrodes and in which the second electrode 442 is a common electrode has been describe by way of example, the first electrode 441 may be a continuous common electrode to form the piezoelectric elements 44, and the second electrodes 442 may be individual electrodes provided for the respective piezoelectric elements 44. Alternatively, both of the first electrodes 441 and the second electrodes 442 may be individual electrodes.

4-3. Modified Example 3

In the embodiments described above, although the serial type liquid ejection apparatus 100 in which the transport body 242 mounting the liquid ejection head 26 is reciprocally transferred has been described by way of example, the present disclosure may also be applied to a line type liquid ejection apparatus in which the nozzles N are provided over the entire width of the medium 12.

4-4. Modified Example 4

The liquid ejection apparatus 100 described in each of the above embodiments may be applied to, besides an apparatus exclusively used for printing, various types of apparatuses, such as a facsimile apparatus and a copying machine. In addition, the application of the liquid ejection apparatus of the present disclosure is not limited to printing. For example, a liquid ejection apparatus which ejects solutions of colorants may be used as a manufacturing apparatus which forms a color filter of a liquid crystal display apparatus. In addition, a liquid ejection apparatus which ejects a solution of an electrically conductive material may be used as a manufacturing apparatus which forms wires and/or electrodes of a wiring substrate.

EXAMPLES

Hereinafter, concrete examples of the present disclosure will be described. In addition, the present disclosure is not limited to the following examples.

A. Manufacturing of Vibration Plate Using Titanium Oxide for Second Layer

A-1. Example A1

First, one surface of a silicon single crystal substrate having a plane orientation of (110) was thermal-oxidized, so that a first layer having a thickness of 1,460 nm was formed from silicon oxide.

Next, on the first layer, after a film was formed from titanium by a sputtering method, the film thus formed was thermal-oxidized at 650° C., so that a second layer having a thickness of 10 nm was formed primarily from titanium oxide.

Subsequently, on the second layer, after a film was formed from zirconium by a sputtering method, the film thus formed was thermal-oxidized at 900° C., so that a third layer having a thickness of 400 nm was formed from zirconium oxide.

Next, for example, by using an aqueous potassium hydroxide solution (KOH) as an etching solution, the other surface of the silicon single crystal substrate was anisotropically etched, so that a concave portion using the first layer as a bottom surface was formed.

Accordingly, an vibration plate including the first layer, the second layer, and the third layer was formed.

A-2. Example A2

Except for that the thickness of the second layer was changed to 15 nm by changing the thickness of the film formed from titanium, an vibration plate was manufactured in a manner similar to that of Example A1 described above.

A-3. Example A3

Except for that the thickness of the second layer was changed to 20 nm by changing the thickness of the film formed from titanium, an vibration plate was manufactured in a manner similar to that of Example A1 described above.

A-4. Example A4

Except for that the thickness of the second layer was changed to 25 nm by changing the thickness of the film formed from titanium, an vibration plate was manufactured in a manner similar to that of Example A1 described above.

A-5. Example A5

Except for that the thickness of the second layer was changed to 30 nm by changing the thickness of the film formed from titanium, an vibration plate was manufactured in a manner similar to that of Example A1 described above.

A-6. Example A6

Except for that the thickness of the second layer was changed to 35 nm by changing the thickness of the film formed from titanium, an vibration plate was manufactured in a manner similar to that of Example A1 described above.

A-7. Example A7

Except for that the thickness of the second layer was changed to 40 nm by changing the thickness of the film formed from titanium, an vibration plate was manufactured in a manner similar to that of Example A1 described above.

A-8. Example A8

Except for that the thickness of the second layer was changed to 50 nm by changing the thickness of the film formed from titanium, an vibration plate was manufactured in a manner similar to that of Example A1 described above.

A-9. Example A9

Except for that the thickness of the second layer was changed to 60 nm by changing the thickness of the film formed from titanium, an vibration plate was manufactured in a manner similar to that of Example A1 described above.

B. Manufacturing of Vibration Plate Using Aluminum Oxide for Second Layer

B-1. Example B1

Except for that a second layer having a thickness of 20 nm was formed primarily from aluminum oxide, an vibration plate was manufactured in a manner similar to that of Example A1 described above. In this case, the second layer was formed by an atomic layer deposition method.

B-2. Example B2

Except for that the thickness of the second layer was changed to 30 nm, an vibration plate was manufactured in a manner similar to that of Example B1 described above.

B-3. Example B3

Except for that the thickness of the second layer was changed to 35 nm, an vibration plate was manufactured in a manner similar to that of Example B1 described above.

B-4. Example B4

Except for that the thickness of the second layer was changed to 40 nm, an vibration plate was manufactured in a manner similar to that of Example B1 described above.

B-5. Example B5

Except for that the thickness of the second layer was changed to 45 nm, an vibration plate was manufactured in a manner similar to that of Example B1 described above.

B-6. Example B6

Except for that the thickness of the second layer was changed to 50 nm, an vibration plate was manufactured in a manner similar to that of Example B1 described above.

C. Manufacturing of Vibration Plate Using Chromium Oxide for Second Layer

C-1. Example C1

Except for that a second layer having a thickness of 1 nm was formed primarily from chromium oxide, and the thickness of the third layer was set to 600 nm, an vibration plate was manufactured in a manner similar to that of Example A1 described above. In this example, the second layer was formed such that after a film was formed from chromium on the first layer by a sputtering method, the film described above was thermal-oxidized at 650° C.

C-2. Example C2

Except for that the thickness of the second layer was changed to 2 nm, an vibration plate was manufactured in a manner similar to that of Example C1 described above.

C-3. Example C3

Except for that the thickness of the second layer was changed to 5 nm, an vibration plate was manufactured in a manner similar to that of Example C1 described above.

C-4. Example C4

Except for that the thickness of the second layer was changed to 15 nm, an vibration plate was manufactured in a manner similar to that of Example C1 described above.

C-5. Example C5

Except for that the thickness of the second layer was changed to 30 nm, an vibration plate was manufactured in a manner similar to that of Example C1 described above.

C-6. Example C6

Except for that the thickness of the second layer was changed to 50 nm, an vibration plate was manufactured in a manner similar to that of Example C1 described above.

D. Manufacturing of Vibration Plate Using No Second Layer

D-1. Comparative Example

Except for that the formation of the second layer was omitted, an vibration plate was manufactured in a manner similar to that of Example A1 described above.

E. Evaluation

E-1. Position of Impurity Peak, Structure of Second Layer, and Si Diffusion

Figure 9:
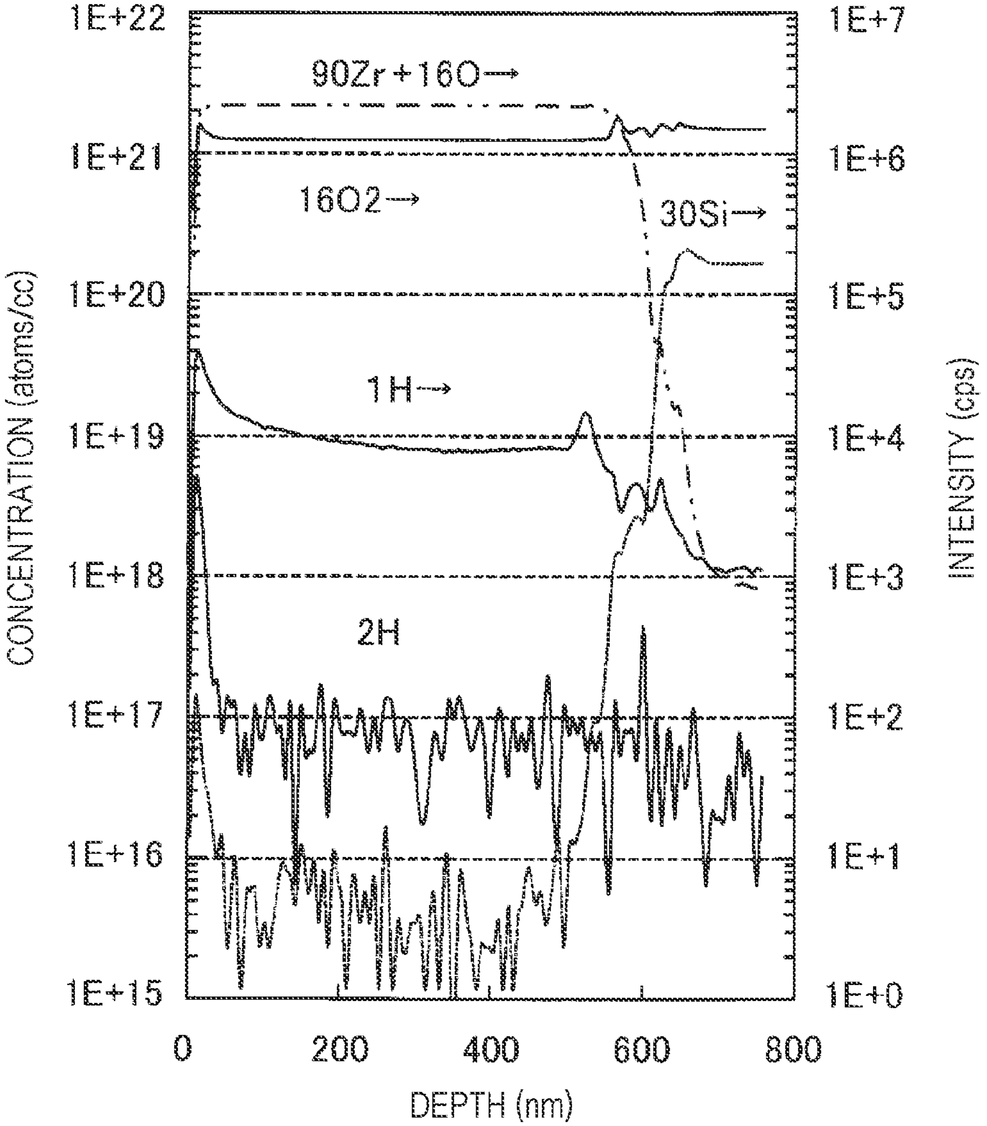
FIG. 9 is a graph showing a SIMS analysis result of an vibration plate in Example A7.
Figure 10:
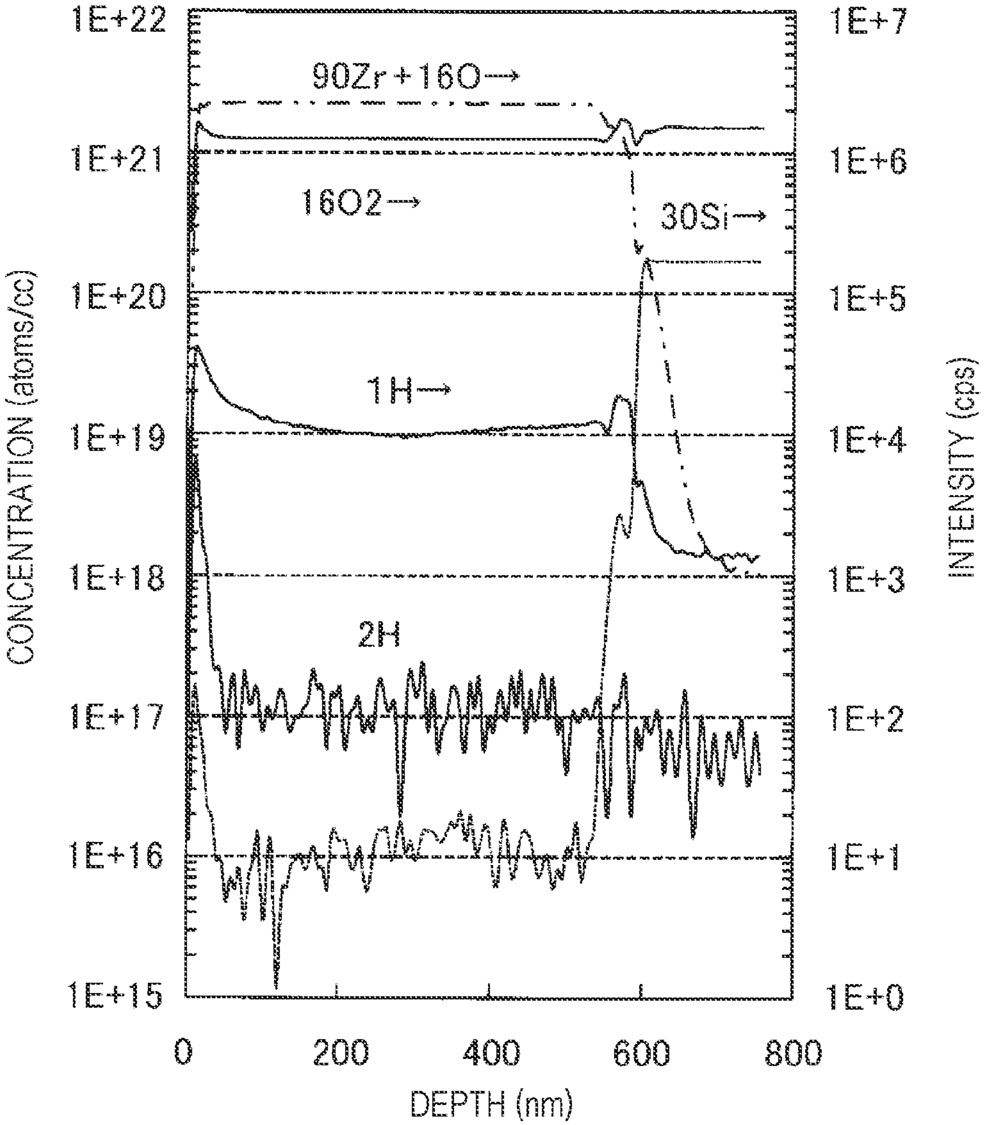
FIG. 10 is a graph showing a SIMS analysis result of an vibration plate in Example B1.
Figure 11:
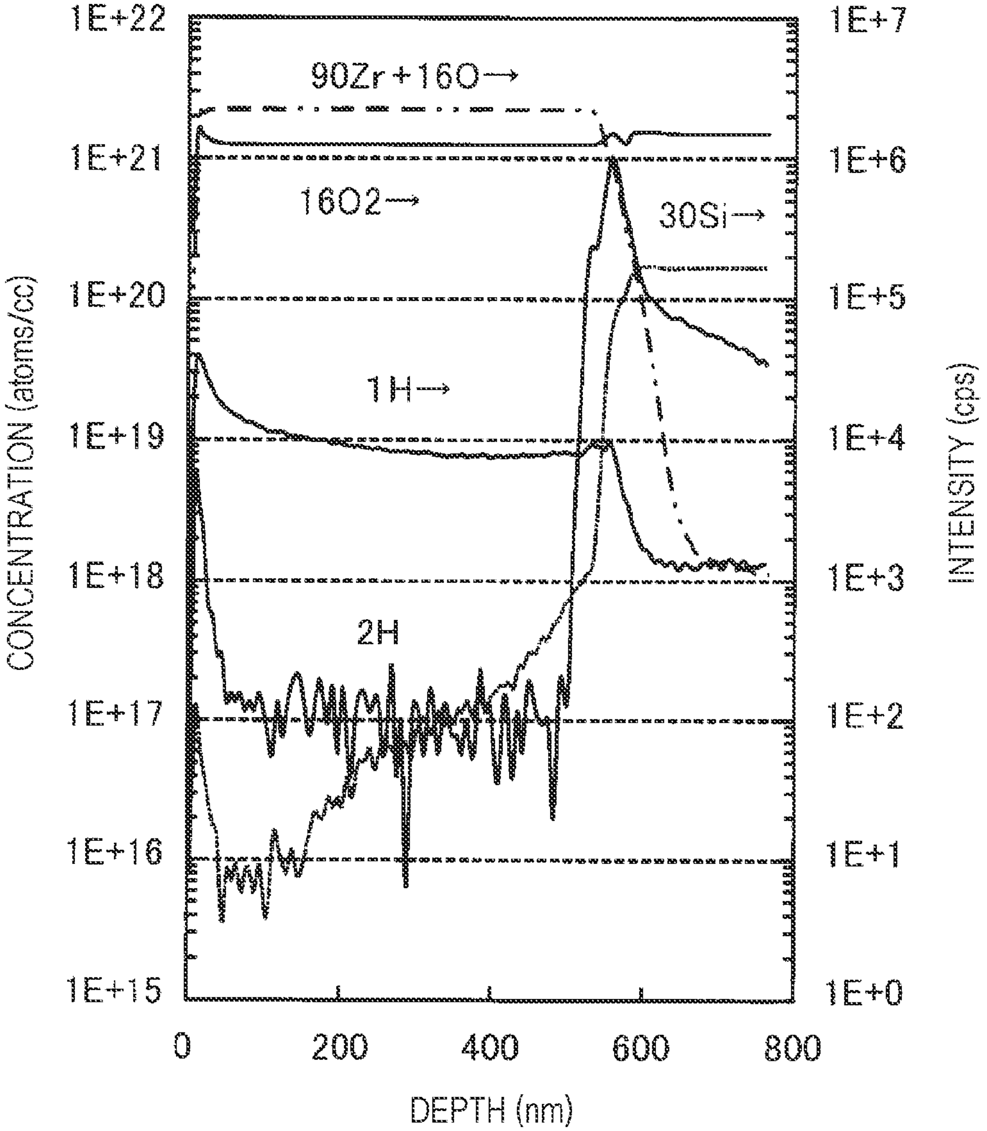
FIG. 11 is a graph showing a SIMS analysis result of an vibration plate in Comparative Example.
Figure 12:
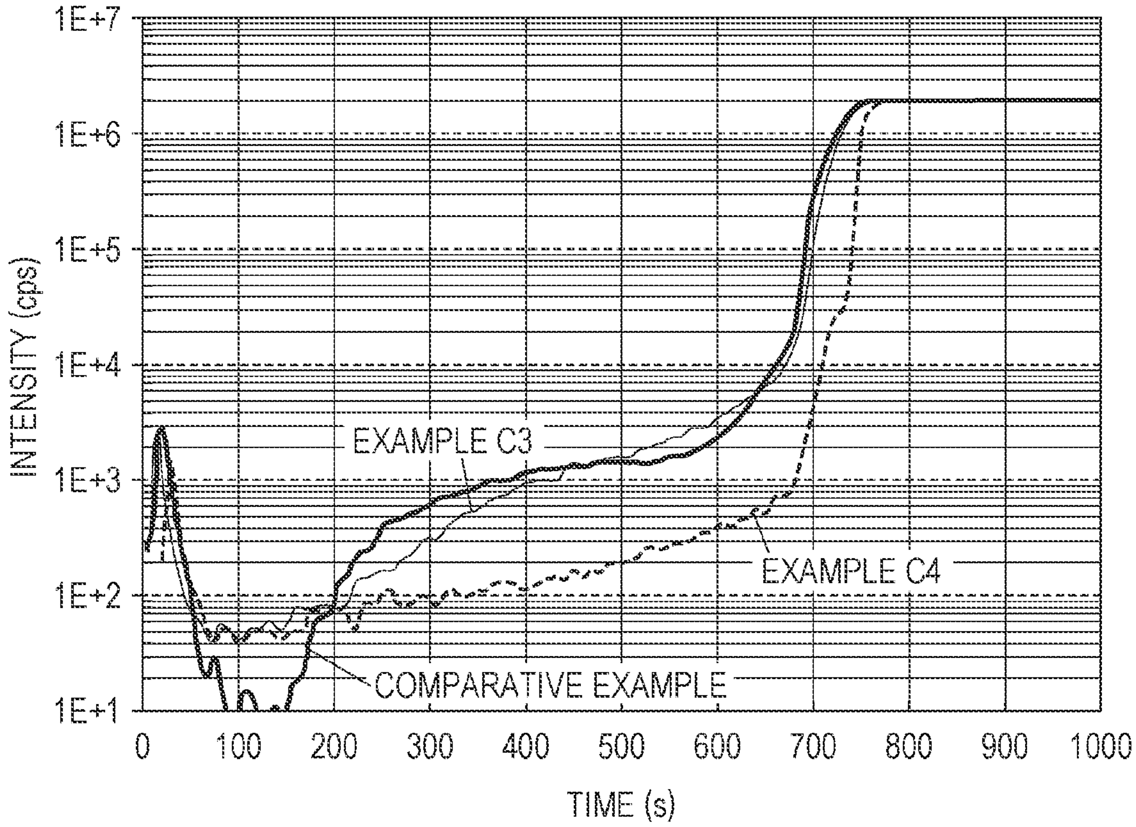
FIG. 12 is a graph showing SIMS analysis results of vibration plates in Examples C3 and C4 and Comparative Example.

Analysis was performed on the vibration plates of Examples and Comparative Example by a secondary ion mass spectroscopy (SIMS). Some analysis results are representatively shown in FIGS. 9 to 12. FIG. 9 shows a SIMS analysis result of the vibration plate of Example A7. FIG. 10 shows a SIMS analysis result of the vibration plate of Example B1. FIG. 11 shows a SIMS analysis result of the vibration plate of Comparative Example. FIG. 12 shows SIMS analysis results of the vibration plates of Examples C3 and C4 and Comparative Example. In addition, in FIG. 12, the distribution of silicon is shown.

From the results of the analysis, in Examples A1 to A7 and B1 to B6, it is found that the peak of the impurity concentration of iron (Fe), chromium (Cr), or the like in the thickness direction of the vibration plate is located in the second layer. In Examples A8, A9, and C1 to C6, it is found that the peak of the impurity concentration is located in the third layer. In Comparative Example, it is found that the peak of the impurity concentration is located in the interface between the first layer and the third layer. Those results are shown in Table 1.

TABLE 1

| | LAYER STRUCTURE OF VIBRATION PLATE | | | | | |
|---|---|---|---|---|---|---|
| | FIRST LAYER | | SECOND LAYER | | THIRD LAYER | |
| | MATERIAL | THICKNESS [nm] | MATERIAL | THICKNESS [nm] | MATERIAL | THICKNESS [nm] |
| EXAMPLE A1 | $SiO_2$ | 1460 | $TiO_2$ | 10 | $ZrO_2$ | 400 |
| EXAMPLE A2 | $SiO_2$ | 1460 | $TiO_2$ | 15 | $ZrO_2$ | 400 |
| EXAMPLE A3 | $SiO_2$ | 1460 | $TiO_2$ | 20 | $ZrO_2$ | 400 |
| EXAMPLE A4 | $SiO_2$ | 1460 | $TiO_2$ | 25 | $ZrO_2$ | 400 |
| EXAMPLE A5 | $SiO_2$ | 1460 | $TiO_2$ | 30 | $ZrO_2$ | 400 |
| EXAMPLE A6 | $SiO_2$ | 1460 | $TiO_2$ | 35 | $ZrO_2$ | 400 |
| EXAMPLE A7 | $SiO_2$ | 1460 | $TiO_2$ | 40 | $ZrO_2$ | 400 |
| EXAMPLE A8 | $SiO_2$ | 1460 | $TiO_2$ | 50 | $ZrO_2$ | 400 |
| EXAMPLE A9 | $SiO_2$ | 1460 | $TiO_2$ | 60 | $ZrO_2$ | 400 |
| EXAMPLE B1 | $SiO_2$ | 1460 | $AlO_x$ | 20 | $ZrO_2$ | 400 |
| EXAMPLE B2 | $SiO_2$ | 1460 | $AlO_x$ | 30 | $ZrO_2$ | 400 |
| EXAMPLE B3 | $SiO_2$ | 1460 | $AlO_x$ | 35 | $ZrO_2$ | 400 |
| EXAMPLE B4 | $SiO_2$ | 1460 | $AlO_x$ | 40 | $ZrO_2$ | 400 |
| EXAMPLE B5 | $SiO_2$ | 1460 | $AlO_x$ | 45 | $ZrO_2$ | 400 |
| EXAMPLE B6 | $SiO_2$ | 1460 | $AlO_x$ | 50 | $ZrO_2$ | 400 |
| EXAMPLE C1 | $SiO_2$ | 1460 | $CrO_x$ | 1 | $ZrO_2$ | 600 |
| EXAMPLE C2 | $SiO_2$ | 1460 | $CrO_x$ | 2 | $ZrO_2$ | 600 |
| EXAMPLE C3 | $SiO_2$ | 1460 | $CrO_x$ | 5 | $ZrO_2$ | 600 |
| EXAMPLE C4 | $SiO_2$ | 1460 | $CrO_x$ | 15 | $ZrO_2$ | 600 |
| EXAMPLE C5 | $SiO_2$ | 1460 | $CrO_x$ | 30 | $ZrO_2$ | 600 |
| EXAMPLE C6 | $SiO_2$ | 1460 | $CrO_x$ | 50 | $ZrO_2$ | 600 |
| COMPARATIVE EXAMPLE | $SiO_2$ | 1460 | — | — | $ZrO_2$ | 400 |

| | EVALUATION | | | | | |
|---|---|---|---|---|---|---|
| | POSITION OF IMPURITY PEAK | SECOND LAYER STRUCTURE | Si DIFFU-SION | MOISTURE INTRUSION | ADHESION | COMPREHENSIVE EVALUATION |
| EXAMPLE A1 | SECOND LAYER | FIRST LAYER | B | B | — | C |
| EXAMPLE A2 | SECOND LAYER | FIRST LAYER | B | B | — | C |
| EXAMPLE A3 | SECOND LAYER | FIRST LAYER | B | B | — | B |
| EXAMPLE A4 | SECOND LAYER | THIRD LAYER | A | A | — | A |
| EXAMPLE A5 | SECOND LAYER | THIRD LAYER | A | A | — | A |
| EXAMPLE A6 | SECOND LAYER | THIRD LAYER | A | A | — | A |
| EXAMPLE A7 | SECOND LAYER | THIRD LAYER | A | A | — | A |
| EXAMPLE A8 | THIRD LAYER | THIRD LAYER | A | A | — | B |
| EXAMPLE A9 | THIRD LAYER | THIRD LAYER | A | A | — | C |
| EXAMPLE B1 | SECOND LAYER | SECOND LAYER | A | A | — | A |
| EXAMPLE B2 | SECOND LAYER | SECOND LAYER | A | A | — | A |
| EXAMPLE B3 | SECOND LAYER | SECOND LAYER | A | A | — | A |
| EXAMPLE B4 | SECOND LAYER | SECOND LAYER | A | A | — | B |
| EXAMPLE B5 | SECOND LAYER | SECOND LAYER | A | A | — | B |

TABLE 1-continued

| | | | | | | |
|---|---|---|---|---|---|---|
| EXAMPLE B6 | SECOND LAYER | SECOND LAYER | A | A | — | B |
| EXAMPLE C1 | THIRD LAYER | FIRST LAYER | A | A | B | B |
| EXAMPLE C2 | THIRD LAYER | FIRST LAYER | A | A | B | A |
| EXAMPLE C3 | THIRD LAYER | FIRST LAYER | A | A | B | A |
| EXAMPLE C4 | THIRD LAYER | FIRST LAYER | A | A | A | A |
| EXAMPLE C5 | THIRD LAYER | SECOND LAYER | A | A | A | A |
| EXAMPLE C6 | THIRD LAYER | SECOND LAYER | A | A | A | B |
| COMPARATIVE EXAMPLE | INTERFACE BETWEEN FIRST LAYER AND THIRD LAYER | — | C | C | C | D |

In addition, in Examples A1 to A3 and C1 to C4, it is found that over the entire region of the second layer in the thickness direction, the impurity is diffused, and the second layer is formed from one layer. In Examples B1 to B6, C5, and C6, it is found that the impurity is diffused only to a part of the second layer at a third layer side, and the second layer is formed from two layers, that is, from one layer in which the impurity is diffused and the other layer in which no impurity is diffused. In Examples A4 to A9, it is found that since the impurity is diffused only to a part of the second layer at a third layer side, and silicon is diffused to a part of the second layer at a first layer side in which no impurity is diffused, the second layer is formed from three layers. Those results are also shown in Table 1.

In addition, the presence or absence of the diffusion of silicon to the third layer was evaluated by the following criteria. The results thereof are shown in Table 1.

A: no diffusion of silicon to third layer

B: slight diffusion of silicon to third layer

C: apparent diffusion of silicon to third layer

E-2. Moisture Intrusion

In Examples and Comparative Example, after the vibration plate was cut into small pieces, the small pieces were exposed in a heavy water environment at a temperature of 45° C. and a humidity of 95% for 24 hours and were then analyzed by a SIMS. This analysis result was evaluated in accordance with the following criteria. The evaluation results are shown in Table 1.

A: no moisture intrusion between first layer and third layer

B: slight moisture intrusion between first layer and third layer

C: apparent moisture intrusion between first layer and third layer

E-3. Adhesion

In Examples C1 to C6 and Comparative Example, as described below, the adhesion between the first layer and the third layer was evaluated.

First, after the vibration plate was cut into small pieces, by using a diluted hydrofluoric acid (water:hydrogen fluoride=50:1) as an etching solution, the small pieces were dipped in the etching solution for 60 minuets. Subsequently, the width of a portion discolored by the etching from the end surface of the small piece was measured at 10 points, and an average value of etching amounts was obtained.

As a result, in Example C1, the etching amount was 310 μm. In Example C2, the etching amount was 288 μm. In Example C3, the etching amount was 170 μm. In Example C4, the etching amount was 11 μm. In Examples C5 and C6, the etching amounts were each 10 μm. In Comparative Example, the etching amount was 346 μm.

From the results described above, the adhesion was evaluated in accordance with the following criteria. The results are shown in Table 1.

A: Etching amount is significantly small, and preferable adhesion is obtained.

B: Although etching amount is slightly large, adhesion is improved.

C: Etching amount is seriously large, and adhesion is inferior.

E-4. Others

In Examples and Comparative Example, a cross-section of the vibration plate was observed by a scanning transmission electron microscope (STEM). As a result, in each Example, no space is generated between the first layer and the third layer. On the other hand, in Comparative Example, a space is generated between the first layer and the third layer. However, in Example A9, a space is generated in the third layer. The reason for this is the generation of strain in a crystal structure of zirconium oxide of the third layer caused by Fe and Cr.

E-5. Comprehensive Evaluation

In consideration of those evaluation results, the comprehensive evaluation was performed. The results are shown in Table 1. Among A, B, C, and D shown as the results of the comprehensive evaluation in Table 1, A is best, and B, C, and D are inferior in this order. As described above, it is found that compared to Comparative Example, in each Example, the diffusion of silicon to the third layer is suppressed, and excellent durability is obtained.

What is claimed is:

1. A liquid ejection head comprising:

a piezoelectric body;

a vibration plate to be vibrated by a drive of the piezoelectric body; and a pressure chamber substrate including a pressure chamber which applies a pressure to a liquid by a vibration of the vibration plate, wherein the pressure chamber substrate, the vibration plate, and the piezoelectric body are laminated in this order, and the vibration plate includes:

a first layer containing silicon as a constituent element;

a second layer which is disposed between the first layer and the piezoelectric body, and which contains as a constituent element, a metal element selected from chromium, titanium, and aluminum; and a third layer which is disposed between the second layer and the piezoelectric body, and which contains zirconium as a constituent element, wherein the second layer has a thickness smaller than that of each of the first layer and the third layer.

2. The liquid ejection head according to claim 1, wherein the first layer contains silicon oxide, and the third layer contains zirconium oxide.

3. The liquid ejection head according to claim 1, wherein the second layer contains chromium oxide.

4. The liquid ejection head according to claim 3, wherein the chromium oxide contained in the second layer has an amorphous structure.

5. The liquid ejection head according to claim 1, wherein the second layer contains titanium oxide.

6. The liquid ejection head according to claim 1, wherein the second layer contains aluminum oxide.

7. The liquid ejection head according to claim 6, wherein the aluminum oxide contained in the second layer has an amorphous structure or a trigonal structure.

8. The liquid ejection head according to claim 1, wherein the second layer has a thickness of 20 to 50 nm.

9. The liquid ejection head according to claim 1, wherein the vibration plate further includes a fourth layer which is disposed between the first layer and the second layer and which contains as a constituent element, the metal element contained in the second layer and silicon.

10. The liquid ejection head according to claim 9, wherein the second layer further contains silicon as a constituent element, and a content of the silicon in the fourth layer is higher than a content of the silicon in the second layer.

11. The liquid ejection head according to claim 1, wherein the vibration plate further includes a fifth layer which is disposed between the second layer and the third layer and which contains as a constituent element, the metal element contained in the second layer and zirconium.

12. The liquid ejection head according to claim 1, further comprising piezoelectric elements including the piezoelectric body, wherein the piezoelectric elements have:

first electrodes provided for the respective piezoelectric elements; and a second electrode commonly provided for the piezoelectric elements, and the first electrodes are disposed between the piezoelectric body and the vibration plate.

13. The liquid ejection head according to claim 1, further comprising piezoelectric elements including the piezoelectric body, wherein the piezoelectric elements have:

a first electrode commonly provided for the piezoelectric elements; and second electrodes provided for the respective piezoelectric elements, and the first electrode is disposed between the piezoelectric body and the vibration plate.

14. A liquid ejection apparatus comprising:

the liquid ejection head according to claim 1; and a control portion which controls a drive of the piezoelectric body.

15. A liquid ejection head comprising:

a piezoelectric body;

a vibration plate to be vibrated by a drive of the piezoelectric body; and a pressure chamber substrate including a pressure chamber which applies a pressure to a liquid by a vibration of the vibration plate, wherein the pressure chamber substrate, the vibration plate, and the piezoelectric body are laminated in this order, and the vibration plate includes:

a first layer containing silicon as a constituent element;

a second layer which is disposed between the first layer and the piezoelectric body, and which contains as a constituent element, a metal element selected from chromium, titanium, and aluminum; and a third layer which is disposed between the second layer and the piezoelectric body, and which contains zirconium as a constituent element, wherein the metal element contained in the second layer is unlikely to be oxidized as compared to zirconium.

16. The liquid ejection head according to claim 15, wherein the metal element contained in the second layer is unlikely to be oxidized as compared to silicon.

17. A liquid ejection head comprising:

a piezoelectric body;

a vibration plate to be vibrated by a drive of the piezoelectric body; and a pressure chamber substrate including a pressure chamber which applies a pressure to a liquid by a vibration of the vibration plate, wherein the pressure chamber substrate, the vibration plate, and the piezoelectric body are laminated in this order, and the vibration plate includes:

a first layer containing silicon as a constituent element;

a second layer which is disposed between the first layer and the piezoelectric body, and which contains as a constituent element, a metal element selected from chromium, titanium, and aluminum; and a third layer which is disposed between the second layer and the piezoelectric body, and which contains zirconium as a constituent element, wherein free energy of oxide formation of the metal element contained in the second layer is higher than free energy of oxide formation of zirconium.

18. The liquid ejection head according to claim 17, wherein the free energy of oxide formation of the metal element contained in the second layer is higher than free energy of oxide formation of silicon.

19. A liquid ejection head comprising:

a piezoelectric body;

a vibration plate to be vibrated by a drive of the piezoelectric body; and a pressure chamber substrate including a pressure chamber which applies a pressure to a liquid by a vibration of the vibration plate, wherein the pressure chamber substrate, the vibration plate, and the piezoelectric body are laminated in this order, and the vibration plate includes:

a first layer containing silicon as a constituent element;

a second layer which is disposed between the first layer and the piezoelectric body, and which contains as a constituent element, a metal element selected from chromium, titanium, and aluminum; and a third layer which is disposed between the second layer and the piezoelectric body, and which contains zirconium as a constituent element, wherein the second layer contains titanium oxide, and wherein the titanium oxide contained in the second layer has a rutile structure.

20. A liquid ejection head comprising:

a piezoelectric body;

a vibration plate to be vibrated by a drive of the piezoelectric body; and a pressure chamber substrate including a pressure chamber which applies a pressure to a liquid by a vibration of the vibration plate, wherein the pressure chamber substrate, the vibration plate, and the piezoelectric body are laminated in this order, and the vibration plate includes:

a first layer containing silicon as a constituent element;

a second layer which is disposed between the first layer and the piezoelectric body, and which contains as a constituent element, a metal element selected from chromium, titanium, and aluminum; and a third layer which is disposed between the second layer and the piezoelectric body, and which contains zirconium as a constituent element, wherein the second layer and the third layer each contain an impurity.

21. The liquid ejection head according to claim 20, wherein a content of the impurity in the second layer is higher than a content of the impurity in the third layer.

* * * * *